US012679571B2

(12) United States Patent
Savello et al.

(10) Patent No.: US 12,679,571 B2
(45) Date of Patent: Jul. 14, 2026

(54) UNMANNED AERIAL VEHICLES INCLUDING REMOVABLE GIMBAL MODULES

(71) Applicant: Skydio, Inc., San Mateo, CA (US)

(72) Inventors: Alexander David Savello, San Francisco, CA (US); Christopher Michael Schwab, Woodside, CA (US); Yevgeniy Andreyevich Kozlenko, New Fairfield, CT (US); Patrick Allen Lowe, Palo Alto, CA (US)

(73) Assignee: Skydio, Inc., San Mateo, CA (US)

( * ) Notice: Subject to any disclaimer, the term of this patent is extended or adjusted under 35 U.S.C. 154(b) by 58 days.

(21) Appl. No.: 18/776,093

(22) Filed: Jul. 17, 2024

(65) Prior Publication Data

US 2025/0346376 A1      Nov. 13, 2025

Related U.S. Application Data

(60) Provisional application No. 63/527,261, filed on Jul. 17, 2023, provisional application No. 63/527,263, filed on Jul. 17, 2023, provisional application No. 63/527,262, filed on Jul. 17, 2023, provisional application No. 63/527,259, filed on Jul. 17, 2023.

(51) Int. Cl.
| | |
|---|---|
| *B64U 20/87* | (2023.01) |
| *B64U 10/14* | (2023.01) |
| *B64U 20/92* | (2023.01) |
| *B64U 20/96* | (2023.01) |
| *B64U 101/30* | (2023.01) |

(52) U.S. Cl.
CPC ............. *B64U 20/87* (2023.01); *B64U 10/14* (2023.01); *B64U 20/92* (2023.01); *B64U 20/96* (2023.01); *B64U 2101/30* (2023.01)

(58) Field of Classification Search
CPC ........ B64U 20/87; B64U 10/14; B64U 20/92; B64U 20/96; B64U 2101/30; B64U 20/70
See application file for complete search history.

(56) References Cited

U.S. PATENT DOCUMENTS

| | | |
|---|---|---|
| 3,824,598 A | 7/1974 | Beaussay |
| 7,325,772 B1 | 2/2008 | Hanewinkel, III |
| 9,415,878 B2 | 8/2016 | Wetzel |
| 9,764,833 B1 | 9/2017 | Tighe |
| | (Continued) | |

FOREIGN PATENT DOCUMENTS

| | | |
|---|---|---|
| EP | 3412579 B1 | 11/2019 |
| EP | 3856631 B1 | 6/2023 |
| | (Continued) | |

OTHER PUBLICATIONS

International Search Report and Written Opinion mailed on Sep. 27, 2024 in corresponding PCT Application No. PCT/US2024/038424.

*Primary Examiner* — Justin M Benedik
(74) *Attorney, Agent, or Firm* — Young Basile Hanlon & MacFarlane, P.C.

(57) ABSTRACT

An unmanned aerial vehicle (UAV) that includes a chassis and a gimbal module. The gimbal module includes at least one optical component that facilitates image capture, and is configured for removable connection to the chassis to facilitate repeated connection and disconnection of the gimbal module and interchangeability amongst a plurality of gimbal modules.

20 Claims, 30 Drawing Sheets

(56) References Cited

U.S. PATENT DOCUMENTS

| | | | |
|---|---|---|---|
| 10,126,722 | B2 | 11/2018 | Sweet, III et al. |
| 10,150,560 | B2 | 12/2018 | Tighe |
| 10,442,553 | B2 | 10/2019 | Hesselbarth et al. |
| 10,455,155 | B1 * | 10/2019 | Kalinowski .......... H04N 23/683 |
| 10,669,037 | B1 | 6/2020 | Kwon |
| 10,981,670 | B2 | 4/2021 | Garvin |
| 11,053,022 | B2 * | 7/2021 | Bin ........................ F16M 13/02 |
| 11,453,513 | B2 | 9/2022 | Thompson et al. |
| 11,611,700 | B2 | 3/2023 | Henry et al. |
| 11,613,350 | B1 | 3/2023 | Bodla |
| 11,745,865 | B2 | 9/2023 | Tian |
| 11,970,287 | B2 | 4/2024 | Thompson et al. |
| 11,987,385 | B2 | 5/2024 | Garvin |
| 12,012,203 | B2 | 6/2024 | Harris |
| 12,012,224 | B2 | 6/2024 | Thompson et al. |
| 12,037,125 | B1 | 7/2024 | LeClerc |
| 12,077,316 | B2 | 9/2024 | Thompson et al. |
| 12,145,714 | B2 | 11/2024 | Thompson et al. |
| 12,157,553 | B2 | 12/2024 | Thompson et al. |
| 12,202,633 | B2 | 1/2025 | Cai |
| 12,296,972 | B2 | 5/2025 | Asanuma |
| 2005/0280705 | A1 | 12/2005 | Anderson |
| 2010/0021288 | A1 | 1/2010 | Collette |
| 2010/0025528 | A1 | 2/2010 | Jackson |
| 2012/0083945 | A1 | 4/2012 | Oakley |
| 2012/0234969 | A1 | 9/2012 | Savoye |
| 2014/0061376 | A1 | 3/2014 | Fisher |
| 2016/0272316 | A1 | 9/2016 | Nelson |
| 2016/0297520 | A1 | 10/2016 | Sada-Salinas |
| 2016/0332724 | A1 | 11/2016 | Mehring |
| 2018/0002023 | A1 | 1/2018 | Tian |
| 2018/0032040 | A1 | 2/2018 | Sweet, III et al. |
| 2018/0032042 | A1 | 2/2018 | Turpin et al. |
| 2018/0105268 | A1 | 4/2018 | Tighe et al. |
| 2018/0350086 | A1 | 12/2018 | Sweet, III et al. |
| 2019/0002124 | A1 | 1/2019 | Garvin |
| 2019/0118969 | A1 | 4/2019 | Hesselbarth et al. |
| 2019/0127056 | A1 | 5/2019 | Weekes |
| 2019/0329903 | A1 * | 10/2019 | Thompson ............ B64C 39/024 |
| 2020/0036878 | A1 * | 1/2020 | Appel .................. H04N 23/685 |
| 2020/0284392 | A1 | 9/2020 | Su et al. |
| 2021/0314490 | A1 * | 10/2021 | Kalinowski ........ H04N 23/6812 |
| 2021/0316881 | A1 | 10/2021 | Garvin |
| 2021/0323668 | A1 | 10/2021 | Seung |
| 2021/0339859 | A1 * | 11/2021 | Agostino ................ B64D 1/08 |
| 2021/0403177 | A1 | 12/2021 | Thompson et al. |
| 2022/0009647 | A1 | 1/2022 | Johannesson |
| 2022/0014675 | A1 | 1/2022 | Henry et al. |
| 2022/0263586 | A1 | 8/2022 | Winzer |
| 2022/0315240 | A1 | 10/2022 | Kubisiak et al. |
| 2022/0355950 | A1 * | 11/2022 | Lukaczyk ............ G03B 15/006 |
| 2022/0355952 | A1 | 11/2022 | Thompson et al. |
| 2022/0411102 | A1 | 12/2022 | Thompson et al. |
| 2022/0411103 | A1 | 12/2022 | Thompson et al. |
| 2023/0002074 | A1 | 1/2023 | Thompson et al. |
| 2023/0010644 | A1 | 1/2023 | Heggen |
| 2023/0018654 | A1 | 1/2023 | Winzer |
| 2023/0043794 | A1 | 2/2023 | Winzer |
| 2023/0097186 | A1 | 3/2023 | Johannesson et al. |
| 2023/0144408 | A1 | 5/2023 | Thompson et al. |
| 2023/0166862 | A1 | 6/2023 | Thompson et al. |
| 2023/0176304 | A1 | 6/2023 | Winzer |
| 2023/0239575 | A1 | 7/2023 | Henry et al. |
| 2023/0305247 | A1 | 9/2023 | Hemp |
| 2023/0305249 | A1 | 9/2023 | Hemp |
| 2023/0354541 | A1 | 11/2023 | Cole |
| 2023/0375793 | A1 | 11/2023 | Winzer |
| 2024/0166382 | A1 | 5/2024 | Boudreau et al. |
| 2024/0262528 | A1 | 8/2024 | Garvin |
| 2024/0272527 | A1 | 8/2024 | Wong |
| 2024/0302612 | A1 | 9/2024 | Winzer |
| 2025/0002144 | A1 | 1/2025 | Thompson et al. |
| 2025/0058871 | A1 | 2/2025 | Thompson et al. |
| 2025/0187726 | A1 | 6/2025 | Thompson et al. |

FOREIGN PATENT DOCUMENTS

| | | | | |
|---|---|---|---|---|
| WO | WO-2017106324 | A1 * | 6/2017 | ............. B64U 80/70 |
| WO | WO-2021146295 | A1 * | 7/2021 | ............. B64D 47/08 |

* cited by examiner

UNMANNED AERIAL VEHICLES INCLUDING REMOVABLE GIMBAL MODULES

CROSS-REFERENCE TO RELATED APPLICATIONS

This application is a continuation of U.S. application Ser. No. 18/776,086, filed on Jul. 17, 2024, which claims priority to U.S. Provisional Application No. 63/527,259, filed on Jul. 17, 2023, U.S. Provisional Application No. 63/527,261, filed on Jul. 17, 2023, U.S. Provisional Application No. 63/527, 262, filed on Jul. 17, 2023, and U.S. Provisional Application No. 63/527,263, filed on Jul. 17, 2023, the entire contents of each of the above-identified applications being hereby incorporated by reference.

TECHNICAL FIELD

The present disclosure relates to vision systems and thermal management (e.g., cooling) systems for unmanned aerial vehicles (UAVs) (e.g., drones).

BACKGROUND

Known UAVs often include a vision system with at least one (one or more) image and/or video capture assemblies (e.g., cameras), which are typically mounted to a body of the UAV, and a thermal management (cooling) system that regulates and dissipates heat generated during use of the UAV by driving air through the UAV via a blower (e.g., a fan or the like). During flight, however, elevated stresses can cause the body of the UAV to flex and/or bend, which results in unintended movement of the image capture device(s) and, thus, image distortion. Additionally, due to spatial constraints and complex internal architecture, airflow into the blower is often obstructed by a variety of components, which can undermine the efficiency and/or the efficacy of the thermal management system.

Additionally, certain UAVs include one or more optical components (e.g., lenses, cameras, etc.,) that are configured to capture (visual) content during operation of the UAVs. In order to increase the field-of-view and support more robust content capture, the optical component(s) are often mounted to a gimbal assembly. However, the gimbal assembly is typically located beneath the UAV and is fixedly (e.g., non-removably) connected thereto, which not only limits the field-of-view, but inhibits the overall utility of the optical component(s). For example, positioning the gimbal assembly beneath the UAV substantially inhibits (if not entirely prevents) the capture of any content that is located vertically above the UAV, and fixedly connecting the gimbal assembly to the UAV restricts the UAV to the image capture capabilities of the particular optical component(s) that are included.

The present disclosure addresses these deficiencies by providing a UAV that offers improved vision and thermal management systems, as well as a gimbal module that is positioned at a front end of the UAV and which is removably connected thereto in order to facilitate interchangeability amongst a plurality of gimbal modules and increase the image capture capabilities of the UAV.

SUMMARY

In one aspect of the present disclosure, an unmanned aerial vehicle (UAV) is disclosed that includes: a chassis; a plurality of arms that extend outwardly from the chassis; a plurality of propeller assemblies that are supported by the plurality of arms; a canopy that is connected to the chassis so as to provide an outer cover for the UAV that is configured to protect internal components thereof; a frame that is supported by the canopy such that the frame is isolated from the chassis; and a plurality of image capture assemblies that are supported by the frame such that the frame separates the plurality of image capture assemblies from the chassis and the canopy so as to inhibit relative movement between the plurality of image capture assemblies during operation of the UAV.

In certain embodiments, the frame may be indirectly connected to the canopy such that the frame is suspended within the UAV.

In certain embodiments, the UAV may further include a plurality of dampers that are positioned between the canopy and the frame in order to inhibit force transmission to the plurality of image capture assemblies during operation of the UAV.

In certain embodiments, the frame may include a plurality of receptacles that are configured to receive the plurality of dampers.

In certain embodiments, the canopy may include a plurality of bosses that extend inwardly therefrom.

In certain embodiments, the plurality of dampers may be supported by the plurality of bosses.

In certain embodiments, the plurality of image capture assemblies may include: a first image capture assembly; a second image capture assembly; and a third image capture assembly.

In certain embodiments, the frame may define: a first apex; a second apex; and a third apex.

In certain embodiments, the first image capture assembly may be supported by the frame adjacent to the first apex, the second image capture assembly may be supported by the frame adjacent to the second apex, and the third image capture assembly may be supported by the frame adjacent to the third apex.

In certain embodiments, the frame may be formed from cast magnesium.

In certain embodiments, the frame may include at least one reinforced section such that the frame defines a non-uniform thickness.

In certain embodiments, the UAV may further include at least one electrical connector that is supported by the canopy.

In certain embodiments, the canopy may include at least one accessory port that is configured to provide access to the at least one electrical connector in order to facilitate connection of at least one accessory module to the UAV.

In another aspect of the present disclosure, a UAV is disclosed that includes: a chassis; a canopy that is connected to the chassis so as to conceal and protect internal components of the UAV and which includes at least one accessory port; a plurality of dampers that are supported by the canopy; a frame that is configured to receive the plurality of dampers such that the frame is devoid of direct connection to the canopy; a plurality of image capture assemblies that are supported by the frame so as to inhibit force transmission to the plurality of image capture assemblies; a vision management circuit board that is supported by the frame and which is in electrical communication with the plurality of image capture assemblies; at least one electrical connector that is supported by the canopy, wherein the at least one accessory port provides access to the at least one electrical connector in order to facilitate the connection of at least one accessory module to the UAV; and an accessory circuit board that is in electrical communication with the at least one electrical connector and the vision management circuit board and which is supported by the at least one electrical connector such that the accessory circuit board is devoid of direct connection to the canopy so as to facilitate access to the accessory circuit board upon removal of the canopy from the chassis.

In certain embodiments, the accessory circuit board may extend about the frame.

In certain embodiments, the accessory circuit board may include a flexible construction.

In certain embodiments, the plurality of image capture assemblies may include: a first image capture assembly; a second image capture assembly; and a third image capture assembly.

In certain embodiments, the frame may define: a first apex; a second apex; and a third apex.

In certain embodiments, the first image capture assembly may be supported by the frame adjacent to the first apex, the second image capture assembly may be supported by the frame adjacent to the second apex, and the third image capture assembly may be supported by the frame adjacent to the third apex.

In certain embodiments, the frame may be generally A-shaped in configuration.

In certain embodiments, the frame may be generally triangular in configuration.

In another aspect of the present disclosure, a UAV is disclosed that includes: a front chassis; a plurality of front arms that extend outwardly from the front chassis; a plurality of front propeller assemblies that are supported by the plurality of front arms; a lower canopy that is supported by the front chassis; a plurality of lower dampers that are supported by the lower canopy; a lower frame that is supported by the plurality of lower dampers such that the plurality of lower dampers absorb force applied to the UAV during operation; a rear chassis that is connected to the front chassis; a plurality of rear arms that extend outwardly from the rear chassis; a plurality of rear propeller assemblies that are supported by the plurality of rear arms; an upper canopy that is supported by the rear chassis; a plurality of upper dampers that are supported by the upper canopy; and an upper frame that is supported by the plurality of upper dampers such that the plurality of upper dampers absorb force applied to the UAV during operation. The lower frame includes a generally A-shaped configuration that defines: a first apex, which supports a first lower image capture assembly: a second apex, which supports a second lower image capture assembly; and a third apex, which supports a third lower image capture assembly, whereby the lower frame inhibits relative movement between the first lower image capture assembly, the second lower image capture assembly, and the third lower image capture assembly. The upper frame includes a generally triangular configuration that defines: a first apex, which supports a first upper image capture assembly; a second apex, which supports a second upper image capture assembly; and a third apex, which supports a third upper image capture assembly, whereby the upper frame inhibits relative movement between the first upper image capture assembly, the second upper image capture assembly and the third upper image capture assembly.

In certain embodiments, the lower frame may include a plurality of lower receptacles that are configured to receive the plurality of lower dampers such that the plurality of lower dampers extend into the lower frame.

In certain embodiments, the upper frame may include a plurality of upper receptacles that are configured to receive the plurality of upper dampers such that the plurality of upper dampers extend into the upper frame.

In certain embodiments, the lower frame and the upper frame may be configured such that spacing between the first lower image capture assembly, the second lower image capture assembly, and the third lower image capture assembly is generally identical to spacing between the first upper image capture assembly, the second upper image capture assembly, and the third upper image capture assembly.

In another aspect of the present disclosure, a UAV is disclosed that includes: a front chassis defining an intake port; a rear chassis defining an exhaust port and providing a heatsink for the UAV; and a blower that is located immediately rearward of the intake port so as to facilitate unobstructed airflow through the intake port and into the blower. The blower is configured to direct air through the UAV along an airflow path that extends from the intake port to the exhaust port to thereby cool the UAV.

In certain embodiments, the blower may be positioned adjacent to the intake port.

In certain embodiments, the blower may be configured to draw air into the intake port along a first axis and redirect the air along a second axis that is oriented in generally orthogonal relation to the first axis.

In certain embodiments, the first axis may be oriented in generally parallel relation to a length of the UAV.

In certain embodiments, the heatsink may be configured to redirect the air along a third axis that is oriented in generally parallel relation to the first axis and in generally orthogonal relation to the second axis.

In certain embodiments, the UAV may further include at least one processor that is supported by the heatsink such that the heatsink distributes heat away from the at least one processor.

In certain embodiments, the heatsink may define an internal chamber that is configured to receive the at least one processor such that the at least one processor nests within the heatsink.

In certain embodiments, the heatsink may include at least one cooling array with a plurality of fins that extend outwardly from the heatsink.

In certain embodiments, the at least one processor may be generally aligned with the at least one cooling array.

In certain embodiments, the UAV may further include a filter that is positioned about the intake port and which is configured to inhibit debris from entering the UAV.

In certain embodiments, the filter may include a mesh material.

In another aspect of the present disclosure, a UAV is disclosed that includes: a chassis that provides a heatsink for the UAV; at least one processor; and a blower. The chassis defines an intake port that is located at a front end of the UAV and an exhaust port that is located at a rear end of the UAV. The at least one processor is supported by the heatsink such that the heatsink distributes heat away from the at least one processor, and the blower is located rearwardly of the intake port. The blower is configured to draw air into the intake port along a first axis and redirect the air along a second axis that is oriented in generally orthogonal relation to the first axis so as to direct the air across the heatsink and thereby remove heat from the UAV through the exhaust port.

In certain embodiments, the blower may be positioned adjacent to the intake port.

In certain embodiments, the heatsink may include a plurality of fins that extend in generally parallel relation to the second axis.

In certain embodiments, the heatsink may include a first cooling array and a second cooling array.

In certain embodiments, the first cooling array may include a first plurality of fins, and the second cooling array may include a second plurality of fins.

In certain embodiments, the first plurality of fins may include a first material, and the second plurality of fins may include a second material that is different than the first material.

In certain embodiments, the at least one processor may include a first processor that is generally aligned with the first cooling array, and a second processor that is generally aligned with the second cooling array.

In another aspect of the present disclosure, a method of cooling a UAV is disclosed that includes: drawing air into the UAV through an intake port using a blower that is located adjacent thereto so as to facilitate unobstructed airflow through the intake port and into the blower; redirecting airflow by approximately 90 degrees such that the air is directed across a heatsink in the UAV to thereby distribute heat away from at least one processor that is secured to the heatsink; and directing the air through an exhaust port to thereby remove heat from the UAV.

In certain embodiments, drawing air into the UAV may include drawing the air through a filter that is positioned about the intake port and which is configured to inhibit debris from entering the UAV.

In certain embodiments, redirecting airflow may include directing the air across the heatsink to thereby distribute heat away from a first processor and a second processor.

In certain embodiments, directing air across the heatsink may include directing the air across a first cooling array that is generally aligned with the first processor, and directing the air across a second cooling array that is generally aligned with the second processor.

In another aspect of the present disclosure, a UAV is disclosed that includes a chassis and a gimbal module. The gimbal module includes at least one optical component that facilitates image capture and is located at a front end of the UAV such that the gimbal module extends forwardly from the chassis. The gimbal module includes an armature, which extends at a downward angle, and is configured for removable connection to the chassis to facilitate repeated connection and disconnection of the gimbal module and interchangeability amongst a plurality of gimbal modules.

In certain embodiments, the at least one optical component may include: a first optical component having a first configuration; a second optical component having a second configuration; and a third optical component having a third configuration.

In certain embodiments, the gimbal module may be configured such that the second configuration is different than the first configuration, and such that the third configuration is different than the second configuration.

In certain embodiments, the first optical component may include a telephoto lens.

In certain embodiments, the second optical component may include a narrow focus lens.

In certain embodiments, the third optical component may include a forward-looking infrared lens.

In certain embodiments, the gimbal module may further include a plurality of fasteners, which extend through the armature and into the chassis to facilitate repeated connection and disconnection of the gimbal module, and a head assembly, which is supported by the armature such that the head assembly is repositionable in relation thereto, wherein the head assembly includes the at least one optical component.

In certain embodiments, the armature may include a generally U-shaped configuration defining a receiving space that accommodates the head assembly such that the head assembly is repositionable in relation to the armature within the receiving space.

In certain embodiments, the armature may include a scaffold that is connected to the chassis so as to inhibit relative movement therebetween, and an isolation assembly that is supported by the scaffold, wherein the isolation assembly is configured to inhibit force transmission to the head assembly during operation of the UAV.

In certain embodiments, the armature may further include an electrical housing with a first electrical interface that is configured for electrical connection to a second electrical interface on the chassis such that the gimbal module is operable upon connection.

In certain embodiments, the gimbal module may further include a gimbal assembly that is supported by the isolation assembly, wherein the gimbal assembly is configured to facilitate articulation of the head assembly.

In certain embodiments, the gimbal assembly may include: a first motor that is configured to rotate the head assembly about a first axis; a second motor that is configured to rotate the head assembly about a second axis; and a third motor that is configured to rotate the head assembly about a third axis.

In certain embodiments, the second axis may be oriented in generally non-orthogonal relation to the first axis, and the third axis may be oriented in generally non-orthogonal relation to the second axis.

In another aspect of the present disclosure, a UAV is disclosed that includes: a body having a front chassis and a rear chassis that is connected to the front chassis; a scaffold that is supported by the body; an isolation frame that is supported by the scaffold; a gimbal assembly that is supported by the isolation frame; a head assembly that is supported by the gimbal assembly such that the head assembly is repositionable during operation of the UAV, wherein the head assembly includes at least one optical component that facilitates image capture; and at least one damper that is positioned between the scaffold and the isolation frame in order to inhibit force transmission to the head assembly during operation of the UAV.

In certain embodiments, the gimbal assembly may be configured to rotate the head assembly about a plurality of axes that are oriented in generally non-orthogonal relation.

In certain embodiments, the scaffold may include a first electrical interface that is configured for electrical connection to a second electrical interface on the body such that power and/or data are transmittable to and/or from the head assembly.

In certain embodiments, the scaffold may include an upper frame that is fixedly connected to the rear chassis so as to inhibit relative movement therebetween, and a lower frame that is fixedly connected to the upper frame and the front chassis so as to inhibit relative movement therebetween.

In certain embodiments, the upper frame may include a first material of construction, and the lower frame may include a second material of construction that is different than the first material of construction.

In certain embodiments, the second material of construction may be less rigid than the first material of construction.

In certain embodiments, the isolation frame may include the first material of construction.

In certain embodiments, the first material of construction and the second material of construction may each be non-metallic.

In another aspect of the present disclosure, a gimbal module is disclosed for a UAV that includes: an armature that is configured for connection to a body of the UAV such that the gimbal module extends therefrom in cantilevered relation; a gimbal assembly that is supported by the armature; and a head assembly that is supported by the gimbal assembly such that the head assembly is repositionable in relation to the armature, wherein the head assembly includes at least one optical component that facilitates image capture.

In certain embodiments, the armature may include: a first frame; a second frame that is fixedly connected to the first frame so as to inhibit relative movement therebetween; and a third frame that is supported by the first frame, wherein the gimbal assembly is supported by the third frame.

In certain embodiments, the armature may further include at least one damper that is positioned between the first frame and the third frame in order to inhibit force transmission to the head assembly during operation of the UAV.

In another aspect of the present disclosure, a UAV is disclosed that includes a chassis and a gimbal module that is supported by the chassis. The gimbal module includes a head assembly with at least one optical component, and a gimbal assembly that supports the head assembly. The gimbal assembly is configured to rotate the head assembly about a first axis, a second axis, and a third axis, wherein the second axis is oriented in generally non-orthogonal relation to the first axis, and the third axis is oriented in generally non-orthogonal relation to the second axis.

In certain embodiments, the gimbal module may define a field of view that lies substantially within a range of approximately 50 degrees to approximately 70 degrees.

In certain embodiments, the gimbal module may be configured such that the field of view is approximately 60 degrees.

In certain embodiments, the first axis may extend in generally parallel relation to a width of the UAV.

In certain embodiments, the gimbal module may be configured for rotation through a range of motion about the first axis that lies substantially within a range of approximately 160 degrees to approximately 200 degrees.

In certain embodiments, the gimbal module may be configured such that the range of motion about the first axis is approximately 180 degrees.

In certain embodiments, the second axis may subtend a first angle with a first reference axis that extends in generally parallel relation to a height of the UAV that lies substantially within a range of approximately 40 degrees to approximately 50 degrees.

In certain embodiments, the first angle may be equal to approximately 45 degrees.

In certain embodiments, the third axis may subtend a second angle with a second reference axis that extends in generally parallel relation to a length of the UAV that lies substantially within a range of approximately 15 degrees to approximately 25 degrees.

In certain embodiments, the second angle may be equal to approximately 20 degrees.

In another aspect of the present disclosure, a UAV is disclosed that includes a chassis and a gimbal module that extends forwardly from the chassis in cantilevered relation thereto.

In certain embodiments, the gimbal module may include an armature that extends in generally non-parallel relation to a length of the UAV, and a head assembly that is supported by the armature and which includes at least one optical component.

In certain embodiments, the armature may extend at an acute, downward angle in relation to the length of the UAV.

In certain embodiments, the armature may include: a scaffold that is supported by the chassis; an isolation frame that is supported by the scaffold; and at least one damper that is positioned between the scaffold and the isolation frame in order to inhibit force transmission to the head assembly during operation of the UAV.

In certain embodiments, the at least one damper may extend at an acute angle in relation to a reference axis that extends in generally parallel relation to a height of the UAV.

In another aspect of the present disclosure, a UAV is disclosed that includes a body and a gimbal module that is rotatable through a range of motion of approximately 180 degrees to facilitate orientation of the gimbal module in a generally vertical, upward position. The body includes a chassis, and a plurality of arms that extends outwardly from the chassis and which support a plurality of propeller assemblies. The gimbal module is supported by the chassis at a front end of the UAV such that the gimbal module is configured to capture content that is located vertically above the UAV in the generally vertical, upward position.

In certain embodiments, the gimbal module may extend from the front end of the UAV in cantilevered relation thereto, whereby the UAV is devoid of any structures that are located vertically above the gimbal module.

In certain embodiments, the gimbal module may include an armature, and a head assembly that is supported by the armature such that the head assembly is positioned between uppermost and lowermost surfaces of the body.

In certain embodiments, the gimbal module may include at least one optical component that is located forwardly of the chassis.

In certain embodiments, the at least one optical component may include: a telephoto lens; a narrow focus lens; and a forward-looking infrared lens.

BRIEF DESCRIPTION OF THE DRAWINGS

The present disclosure is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity.

DETAILED DESCRIPTION

Overview

Figure 1:
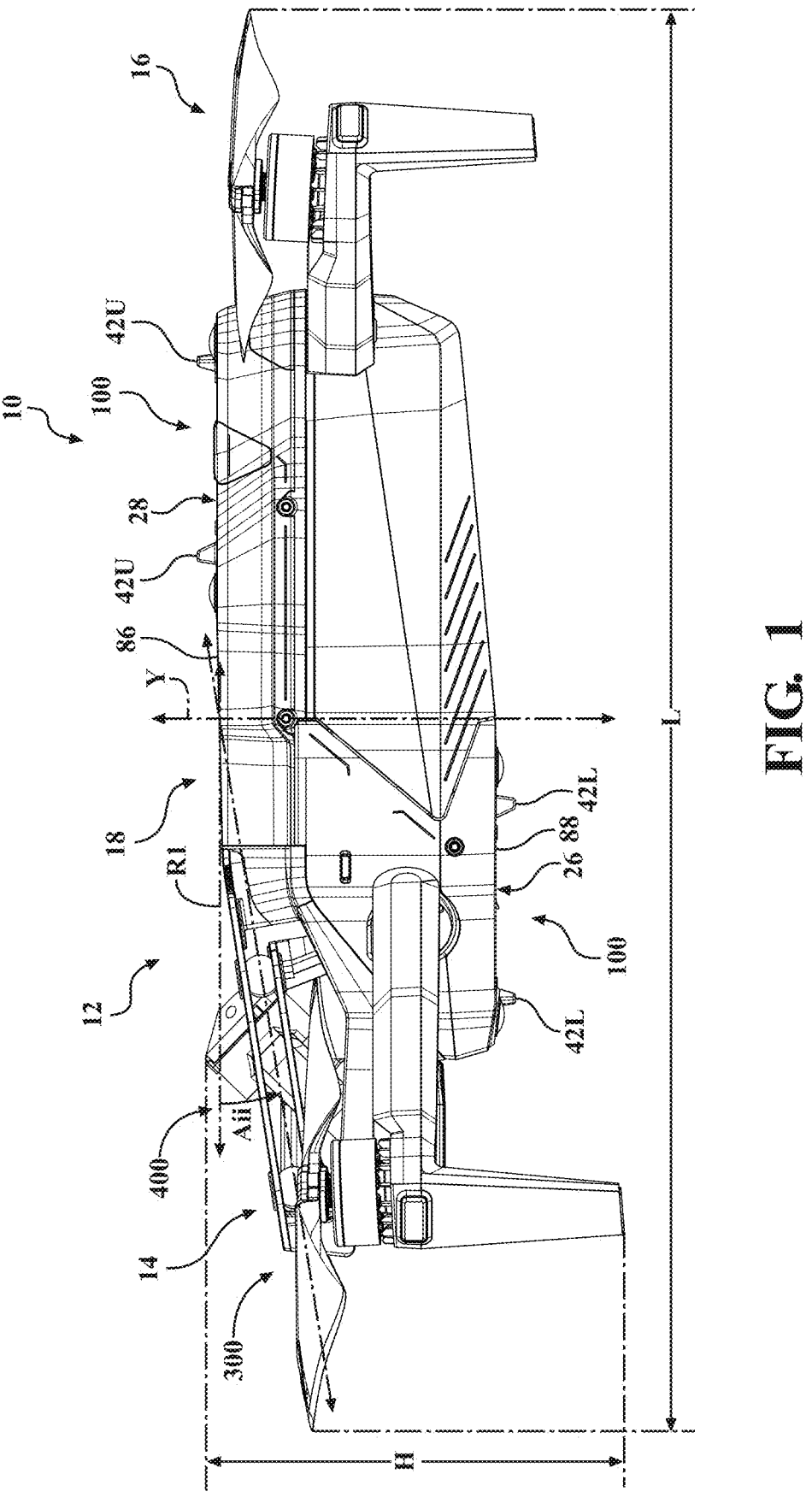
FIG. 1 is a side, plan view of a UAV according to principles of the present disclosure.

The present disclosure relates to vision systems and thermal management (cooling) systems for UAVs. More specifically, the vision systems described herein include a plurality of image capture assemblies (e.g., cameras) and a frame that supports the plurality of image capture assemblies. The frame is suspended within the UAV, which inhibits (if not entirely prevents) force transmission to the plurality of image capture assemblies and, thus, relative movement between the plurality of image capture assemblies, in order to improve image quality and reduce distortion.

The thermal management systems described herein include a heatsink and a blower (e.g., a fan). The heatsink is a component of the UAV chassis, which defines intake and exhaust ports, and the blower is located immediately rearward of the intake port, which facilitates unobstructed airflow through the intake port and into the blower.

Referring now to FIGS. 1-6, an unmanned aerial vehicle (UAV) 10 (e.g., a drone 12) is illustrated having respective front (forward) and rear ends 14, 16. The UAV 10 includes: a body 18; a trinocular vision system 100 with a plurality of image capture assemblies 102 (e.g., cameras 104, video recorders, or other such image and video capture devices), which support navigation of the UAV 10 and the optical avoidance of obstacles; a thermal management (cooling) system 200; and a gimbal module 300. More specifically, as described in further detail below, the UAV 10 includes a plurality of lower image capture assemblies 102L, and a plurality of upper image capture assemblies 102U.

The Body

The body 18 supports the various systems and components of the UAV 10, including the respective aforementioned vision and thermal management systems 100, 200, and includes: a chassis 20; a plurality of arms 22 (e.g., respective front (forward) and rear arms 22F, 22R) that extend outwardly from the chassis 20; a plurality of propeller assemblies 24 (e.g., respective front (forward) and rear propeller assemblies 24F, 24R) that are supported by the plurality of arms 22; a lower (first) canopy 26; and an upper (second) canopy 28, wherein the front propeller assemblies 24F rotate in opposite directions (with one rotating clockwise and the other rotating counterclockwise), and the rear propeller assemblies 24R rotate in opposite directions (with one rotating clockwise and the other rotating counterclockwise).

The chassis 20 is the main structural component of the UAV 10 and includes a front (forward) chassis 30, which supports the front arms 22F and the front propeller assemblies 24F such that the front arms 22F and the front propeller assemblies 24F extend outwardly therefrom, and a rear chassis 32, which acts as (provides) a heatsink 34 for the UAV 10 and supports the rear arms 22R and the rear propeller assemblies 24R such that the rear arms 22R and the rear propeller assemblies 24R extend outwardly therefrom.

In the illustrated embodiment, the front chassis 30 and the rear chassis 32 are configured as discrete components that are secured (connected) together via a plurality of mechanical fasteners 36 (FIG. 4) (e.g., screws, pins, rivets, clips, etc.). Embodiments in which the front chassis 30 and the rear chassis 32 may be integrally (unitarily, monolithically) formed (e.g., from a single piece of material), however, are also envisioned herein and would not be beyond the scope of the present disclosure.

It is envisioned that the chassis 30, 32 may include (e.g., may be formed from) materials of construction that are either substantially similar (e.g., identical) or dissimilar. For example, in the illustrated embodiment, the front chassis 30 includes (e.g., is formed partially or entirely from) a non-metallic material (e.g., a carbon fiber reinforced plastic), and the rear chassis 32 includes (e.g., is formed partially or entirely from) a metallic material (e.g., magnesium).

The canopies 26, 28 provide outer covers for the UAV 10 that conceal and protect the image capture assemblies 102 and the various internal component and systems of the UAV 10. The canopies 26, 28 are configured for removable connection to the chassis 20, which facilitates repeated connection of the canopies 26, 28 to the chassis 20 and disconnection of the canopies 26, 28 from the chassis 20 (e.g., in order to support service and maintenance of the UAV 10). More specifically, the lower canopy 26 is supported by (secured, connected to) the front chassis 30, and the upper canopy 28 is supported by (secured, connected to) the rear chassis 32. It is envisioned that the canopies 26, 28 and the chassis 20 may be secured (connected) together in any manner suitable for the intended purpose of facilitating repeated connection and disconnection. For example, in the illustrated embodiment, the canopies 26, 28 and the chassis 20 are (mechanically) secured (connected) together via mechanical fasteners 38 (e.g., screws, pins, rivets, clips, etc.). It is also envisioned, however, that the canopies 26, 28 and the chassis 20 may be configured for engagement in a press (snap) fit arrangement, which may replace or supplement the connection established by the mechanical fasteners 38.

The lower canopy 26 (FIG. 5) includes a plurality of lower openings 40L, at least one (one or more drain holes) 41, which allow water to exit the UAV 10, and a plurality of lower standoffs 42L. The lower openings 40L are configured to receive the lower image capture assemblies 102L (e.g., such that the lower image capture assemblies 102L extend through the lower openings 40L and protrude from the lower canopy 26), and the lower standoffs 42L extend outwardly from the lower canopy 26 and beyond the lower image capture assemblies 102L in order to protect the lower image capture assemblies 102L from contact with external objects (e.g., during flight, landing, shipping of the UAV 10, etc.).

In order to inhibit (if not entirely prevent) the entry of water and/or debris into the UAV 10 through the lower canopy 26 via the lower openings 40L, it is envisioned that at least one (one or more) sealing members 44 may be provided that are located between the lower canopy 26 and the lower image capture assemblies 102L. The sealing member(s) 44 may be configured in any manner suitable for the intended purpose of creating a seal between the lower canopy 26 and the lower image capture assemblies 102L while inhibiting (if not entirely preventing) the transfer of force to the lower image capture assemblies 102L. For example, it is envisioned that the sealing member(s) 44 may include (or may be configured as) a compressible foam, a gasket, an O-ring, a bushing, etc. It is also envisioned that the sealing member(s) 44 may inhibit (if not entirely prevent) unintended movement (e.g., rattling, deflection, etc.) of the lower image capture assemblies 102L, and, thus, image distortion, thereby further improving image quality.

In the illustrated embodiment, the lower canopy 26 further includes at least one (one or more) lower accessory ports 46L, which provide access to at least one (one or more) corresponding lower electrical connectors 48L (e.g., USB interfaces) in order to facilitate the connection of at least one (one or more) accessory modules (payloads) 50 (FIG. 3) to the UAV 10 (e.g., a GPS module, a lighting module, a parachute, a speaker, a microphone, a spotlight, etc.). In order to accommodate for any offset to the center of gravity of the UAV 10 caused by attachment of the accessory module(s) 50, it is envisioned that the UAV 10 may be configured to recognize the accessory module(s) 50 upon connection to the UAV 10 so as to facilitate variation in the delivery of power to the propeller assemblies 24, operation of the propeller assemblies 24, etc.

It is envisioned that the accessory module(s) 50 may be supported by (secured, connected to) the UAV 10 in any manner for the intended purposes of facilitating repeated connection and disconnection of the accessory module(s) 50. For example, it is envisioned that the lower canopy 26 may include at least one (one or more) support members 52 (e.g., hooks, ports, connectors, etc.) that are configured for engagement (contact) with the accessory module(s) 50.

Although shown as including a single lower accessory port 46L that is oriented in generally parallel relation to a height H (FIG. 1) of the UAV 10, which extends along a generally vertical reference axis Y, it should be appreciated that the specific number of lower accessory ports 46L and/or the orientation(s) thereof may be varied without departing from the scope of the present disclosure. As such, embodiments in which the UAV 10 may include two or more lower accessory ports 46L are envisioned herein, as are embodiments in which the lower accessory port(s) 46L may be omitted altogether and embodiments in which the lower accessory port(s) 46L may be oriented in transverse (e.g., generally orthogonal (perpendicular) relation to the axis Y).

The upper canopy 28 (FIG. 6) includes a plurality of upper openings 40U and a plurality of upper standoffs 42U (FIG. 1). The upper openings 40U are configured to receive the upper image capture assemblies 102U (e.g., such that the upper image capture assemblies 102U extend through the upper openings 40U and protrude from the upper canopy 28), and the upper standoffs 42U extend outwardly from the upper canopy 28 and beyond the upper image capture assemblies 102U in order to protect the upper image capture assemblies 102U from contact with external objects (e.g., during flight, landing, shipping of the UAV 10, etc.).

In order to inhibit (if not entirely prevent) the entry of water and/or debris into the UAV 10 through the upper canopy 28 via the upper openings 40U, it is envisioned that at least one (one or more) of the aforementioned sealing members 44 may be provided between the upper canopy 28 and the upper image capture assemblies 102U. As discussed above in connection with the lower canopy 26A, it is envisioned that the sealing member(s) 44 may inhibit (if not entirely prevent) the transfer of force to the upper image capture assemblies 102U as well as unintended movement (e.g., rattling, deflection, etc.) of the upper image capture assemblies 102U in order to further improve image quality.

In the illustrated embodiment, the upper canopy 28 (FIG. 6) further includes at least one (one or more) upper accessory ports 46U (FIG. 2), which provide access to at least one (one or more) corresponding upper electrical connectors 48U (e.g., USB interfaces) in order to facilitate the connection of at least one (one or more) of the aforementioned accessory module(s) 50 (FIG. 3) to the UAV 10. Although shown as including two upper accessory ports 46Ui, 46Uii that are oriented in transverse (e.g., generally orthogonal (perpendicular) relation) to the axis Y and a single upper accessory port 46Uiii that is oriented in generally parallel relation to the axis Y, it should be appreciated that the specific number of upper accessory ports 46U and/or the orientation(s) thereof may be varied without departing from the scope of the present disclosure. As such, embodiments in which the UAV 10 may include fewer or greater numbers of upper accessory ports 46U are also envisioned herein, as are embodiments in which the upper accessory port(s) 46U may be omitted altogether and embodiments in which the orientations of the upper accessory port(s) 46U may be varied.

As discussed above in connection with the lower canopy 26, it is envisioned that the upper canopy 28 may include at least one (one or more) of the aforementioned support members 52 (FIG. 5) (e.g., hooks, ports, connectors, etc.) that are configured for engagement (contact) with the accessory module(s) 50 such that the accessory module(s) 50 are repeatedly connectable to and disconnectable from the UAV 10.

Figure 7:
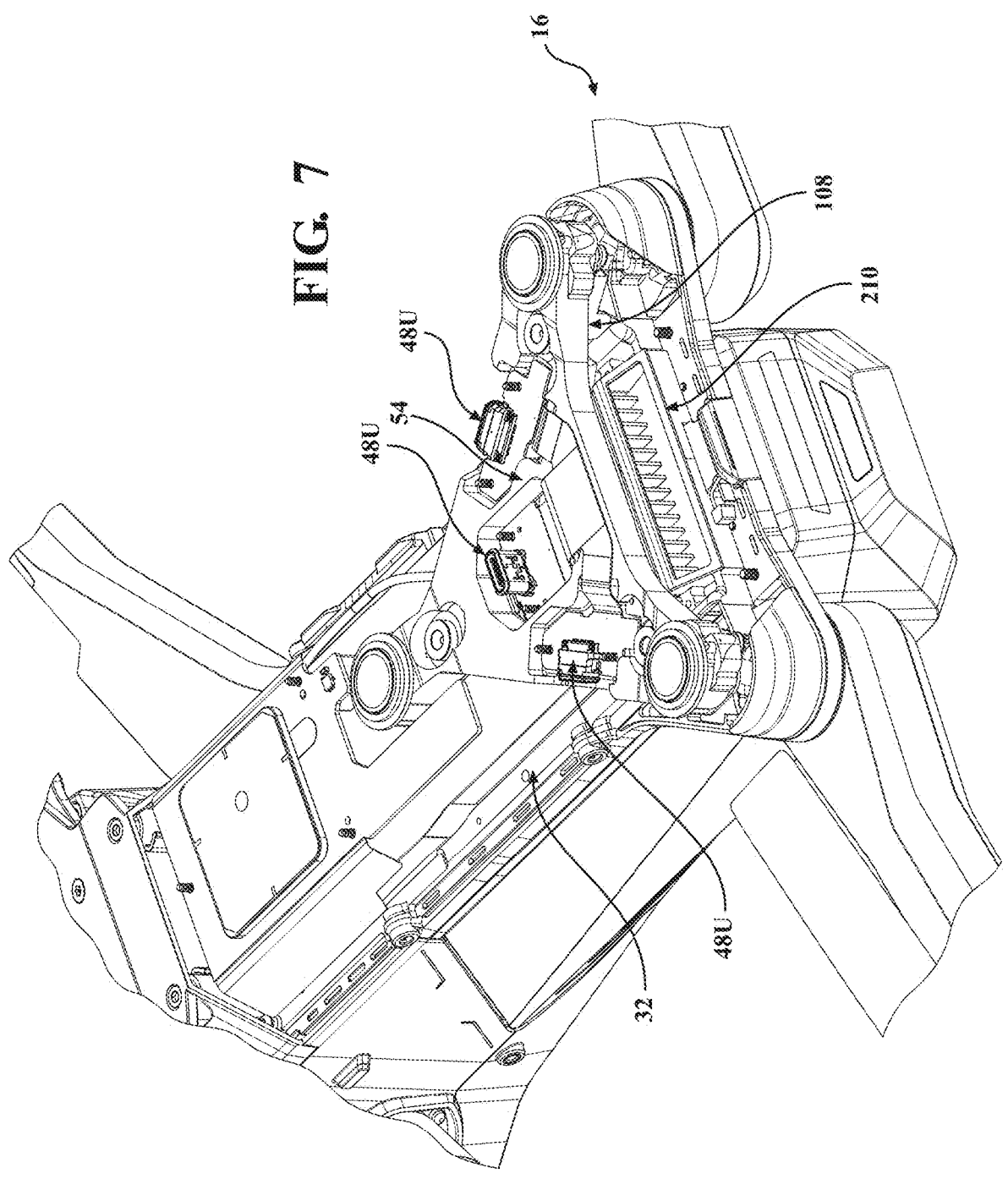
FIG. 7 is a partial, top, rear, perspective view of the UAV with the upper canopy removed.

With reference now to FIG. 7, the UAV 10 includes an upper accessory circuit board 54, which is in electrical communication with the upper electrical connector(s) 48U in order to facilitate the communication of data and/or power to and/or from the upper electrical connector(s) 48U. The accessory circuit board 54 is supported by and is connected to the upper electrical connector(s) 48U such that the accessory circuit board 54 extends therebetween, which eliminates any direct connection between the accessory circuit board 54 and the upper canopy 28 (FIG. 6) and facilitates access to the accessory circuit board 54 upon removal of the upper canopy 28 from the rear chassis 32. In order to reduce spatial requirements, the accessory circuit board 54 includes a flexible construction (e.g., one or more flexible and/or bendable materials), which allows the accessory circuit board 54 to flex and accommodate various internal components of the UAV 10 (e.g., the vision system 100).

The Vision System

Figure 2:
FIG. 2 is a top, front, perspective view of the UAV.
Figure 3:
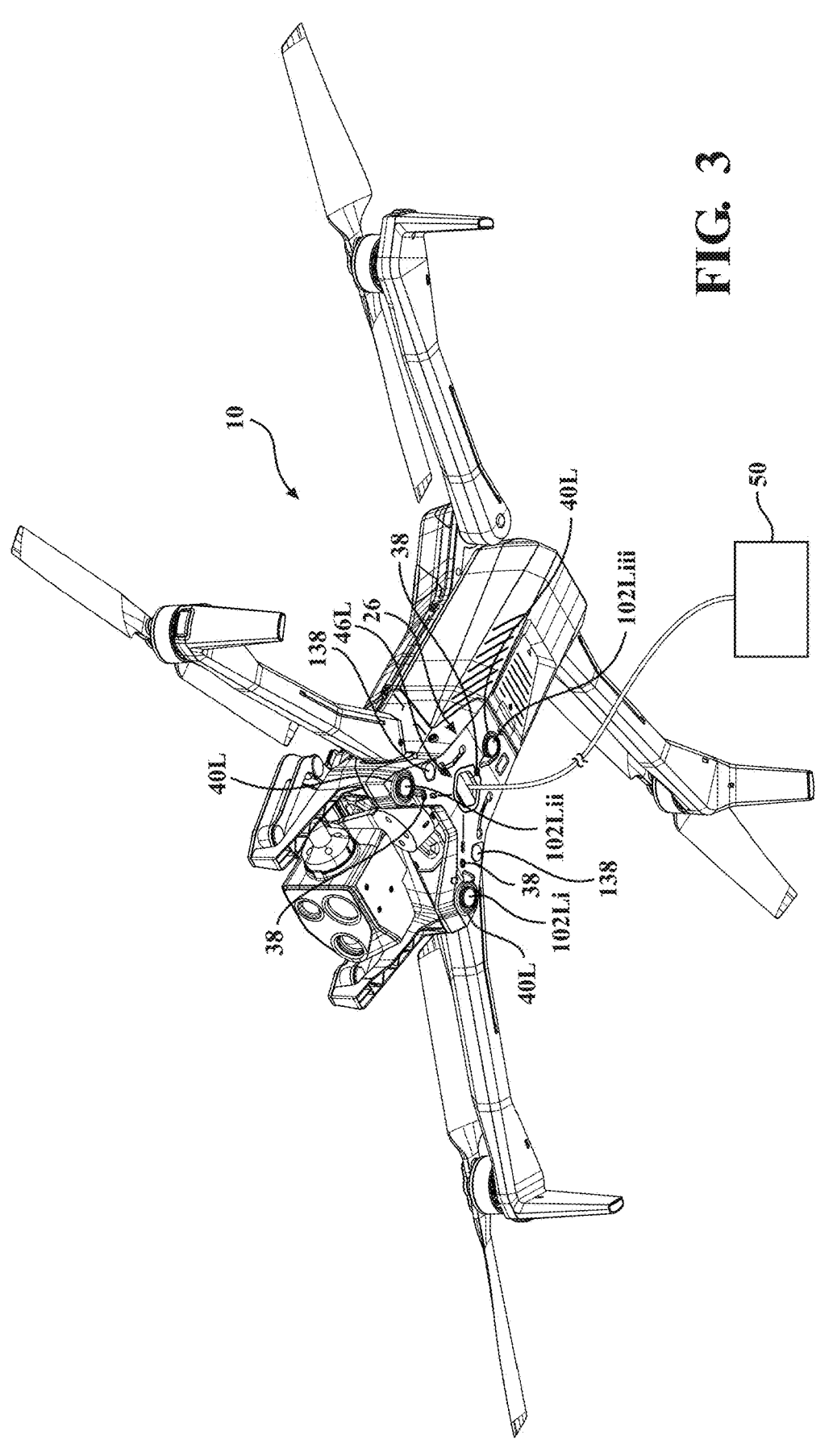
FIG. 3 is a bottom, front, perspective view of the UAV.

With reference now to FIGS. 8-21 as well, in addition to the image capture assemblies 102, the vision system 100 includes respective lower and upper frames 106, 108. The frames 106, 108 are non-identical in configuration and isolate the image capture assemblies 102 from the body 18 of the UAV 10 (e.g., the chassis 20 and the canopies 26, 28) by eliminating any direct connection therebetween, as described in further detail below. More specifically, the vision system 100 includes a trio of (i.e., three) lower image capture assemblies 102L (FIG. 9) (e.g., a first lower image capture assembly 102Li; a second lower image capture assembly 102Lii; and a third lower image capture assembly 102Liii), which are supported by (secured, connected to) the lower frame 106 (e.g., proximate the front end 14 of the UAV 10, as seen in FIGS. 1-3), and a trio of (i.e., three) upper image capture assemblies 102U (FIG. 17) (e.g., a first upper image capture assembly 102Ui; a second upper image capture assembly 102Uii; and a third upper image capture assembly 102Uiii), which are supported by (secured, connected to) the upper frame 108 (e.g., proximate the rear end 16 of the UAV 10, as seen in FIGS. 1-3). More specifically, the frames 106, 108 are configured such that positioning and the spacing of the lower image capture assemblies 102L on the lower frame 106 generally mirrors (e.g., matches, is generally identical to) the positioning and the spacing of the upper image capture assemblies 102U on the upper frame 108. More specifically, frames 106, 108 are configured such that the image capture assemblies 102Li, 102Lii, 102Liii and the image capture assemblies 102Ui, 102Uii, 102Uiii are spaced from each other by a generally equivalent angular distance of approximately 120 degrees.

As discussed in further detail below, the elimination of any direct connection between the image capture assemblies 102 and the body 18 of the UAV 10 inhibits (if not entirely prevents) the transmission of force from the body 18 to the image capture assemblies 102 during operation (e.g., flight) of the UAV 10 (e.g., as a result of bending and/or flexing of the arms 22F, 22R). Inhibiting force transmission to the image capture assemblies 102 in turn improves the quality of the images and/or videos that are captured by the image capture assemblies 102 by inhibiting (if not entirely preventing) relative movement of the image capture assemblies 102 that might otherwise occur (e.g., movement of the lower image capture assemblies 102Li, 102Lii, 102Liii in relation to each other and movement of the upper image capture assemblies 102Ui, 102Uii, 102Uiii in relation to each other).

With reference to FIGS. 9-14 in particular, the lower frame 106 will be discussed, which is rigid in construction and supports the lower image capture assemblies 102L. The lower frame 106 includes a pair of legs (e.g., respective first and second legs) 110, 112 and a cross-member 114 that extends therebetween such that the lower frame 106 is generally A-shaped in configuration.

The A-shaped configuration of the lower frame 106 defines: a (first) apex 116Li; a (second) apex 116Lii; a (third) apex 116Liii; and a receiving space 118, which extends between the legs 110, 112 and the cross-member 114 and is configured to accommodate the gimbal module 300. More specifically, the leg 110 includes a first end 120, which defines the apex 116Li, and an (opposite) second end 122, and the leg 112 includes a first end 124, which defines the apex 116Lii, and an (opposite) second 126, which intersects the second end 122 of the leg 110 so as to define the apex 116Liii.

Figure 9:
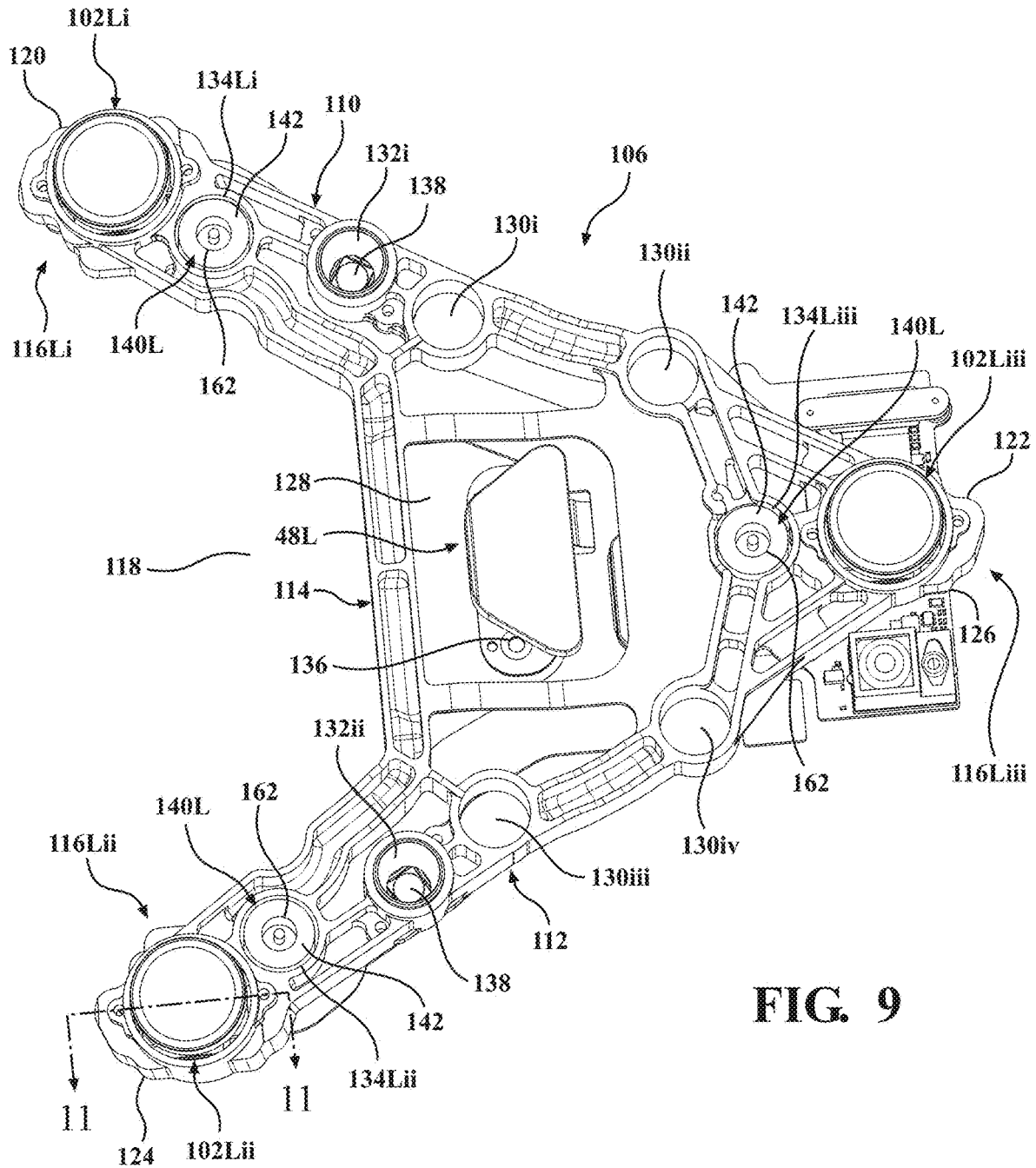
FIG. 9 is a bottom, perspective view of a lower frame, which supports the plurality of lower image capture assemblies.

With continued reference to FIG. 9, the lower frame 106 includes: a (first, lower) window 128; a plurality of clearance openings 130; a plurality of chambers 132; and a plurality of (first, lower) receptacles 134L.

The window 128 extends (entirely) through the lower frame 106 and is configured to accommodate (receive) the lower accessory port(s) 46L (FIGS. 3, 5) and/or the corresponding lower electrical connector(s) 48L, which are supported by (e.g., hard-mounted to) the lower canopy 26 by at least one (one or more) mechanical fasteners 136 (FIGS. 8, 9) (e.g., screws, pins, rivets, clips, etc.).

The plurality of clearance openings 130 are configured to receive the mechanical fasteners 38 (FIGS. 3, 5) that connect the lower canopy 28 to the front chassis 30 such that the mechanical fasteners 38 extend through, but are devoid of engagement with, the lower frame 106.

The chambers 132 are configured to receive landing lights 138 (FIGS. 3, 5, 9) in order to assist with flight and/or guidance of the UAV 10 during landing.

The receptacles 134L are configured to receive a plurality of (first, lower) dampers 140L (e.g., grommets 142) such that the dampers 140L extend into the lower frame 106 via the receptacles 134L.

The dampers 140L are configured to further inhibit (if not entirely prevent) force transmission to the lower frame 106 and, thus, the lower image capture assemblies 102L, by absorbing forces that are applied to the UAV 10 during operation (e.g., flight), as described in further detail below. In order to facilitate such force absorption, it is envisioned that the dampers 140L may include (e.g., may be formed from) any suitable material or combination of materials. For example, it is envisioned that the dampers 140L may include (e.g., may be formed partially or entirely from) at least one (one or more) compliant material such as rubber, silicone, etc.

It is envisioned that the dampers 140L may be secured within the receptacles 134L and connected to the lower frame 106 in any suitable manner. For example, in the illustrated embodiment, the dampers 140L are mechanically secured within the receptacles 134L in an interference fit, as seen in FIG. 9. It is envisioned, however, that the mechanical connection between the dampers 140L and the receptacles 134L may be supplemented by at least one (one or more) mechanical fasteners (e.g., such that the mechanical fasteners extend through the lower frame 106 and into the dampers 140L) and/or replaced by an adhesive connection.

With reference to FIG. 9 in particular, in the illustrated embodiment, the lower frame 106 includes: a single window 128; four clearance openings 130*i*-130*iv*; two chambers 132*i*, 132*ii*; and three receptacles 134Li, 134Lii, 134Liii. More specifically, the window 128 is defined by (formed in) the cross-member 114, the clearance openings 130*i*, 130*ii*, the chamber 132*i*, and the receptacle 134Li are defined by (formed in) the leg 110, the clearance openings 130*iii*, 130*iv*, the chamber 132*ii*, and the receptacle 134Lii are defined by (formed in) the leg 112, and the receptacle 134Liii is defined by (formed in) the cross-member 114, whereby the receptacles 134Li, 134Lii, 134Liii and the corresponding dampers 140L are located (positioned) adjacent to the lower image capture assemblies 102Li, 102Lii, 102Liii and the apex 116Li, the apex 116Lii, and the apex 116Liii, respectively. It should be appreciated, however, that the particular number of windows 128, clearance openings 130, and chambers 132 may be varied in alternate embodiments without departing from the scope of the present disclosure (e.g., depending upon the specific number of lower accessory port(s) 46L included on the UAV 10, the specific size of the UAV 10, etc.).

The lower image capture assemblies 102L are supported by (e.g., secured, connected to) the lower frame 106 at (adjacent to) the apices 116L. More specifically, the lower image capture assemblies 102L are hard-mounted to the lower frame 106 by mechanical fasteners 144 (e.g., screws, pins, rivets, clips, etc.) that extend through the lower image capture assemblies 102L and into the lower frame 106. Connecting the lower image capture assemblies 102L to the lower frame 106 separates the lower image capture assemblies 102L from the body 18 of the UAV 10 (e.g., the lower canopy 26 and the front chassis 30), which inhibits (if not entirely prevents) relative movement between the lower image capture assemblies 102L during operation of the UAV 10, as described in further detail below.

In order to facilitate proper orientation of the lower image capture assemblies 102L in relation to the lower frame 106, it is envisioned that the lower frame 106 and the lower image capture assemblies 102L may include corresponding alignment members 146L, 148L (FIG. 12), respectively. More specifically, in the illustrated embodiment, the lower frame 106 includes a plurality of projections 150 (e.g., pins, detents, etc.) that are configured for insertion into corresponding recesses 152 (e.g., openings, slots, etc.) in the lower image capture assemblies 102L.

It is envisioned that the each of the lower image capture assemblies 102L may be secured (connected) to the lower frame 106 so as to define optical axes X that extend in generally parallel relation to the axis Y. Alternatively, it is envisioned that at least one (one or more) of the lower image capture assemblies 102L may be secured (connected) to the lower frame 106 such that the corresponding optical axis X extends in generally non-parallel relation to the axis Y. For example, in the illustrated embodiment, the lower image capture assemblies 102Li, 102Lii are secured (connected) to the lower frame 106 such that the corresponding optical axes X each extend at an angle Ai (FIG. 11) in relation to the axis Y that lies substantially within the range of approximately 5 degrees to approximately 10 degrees. Embodiments of the UAV 10 in which the angle(s) Ai lie outside of the disclosed range are also envisioned herein, however, and would not be beyond the scope of the present disclosure.

Figure 8:
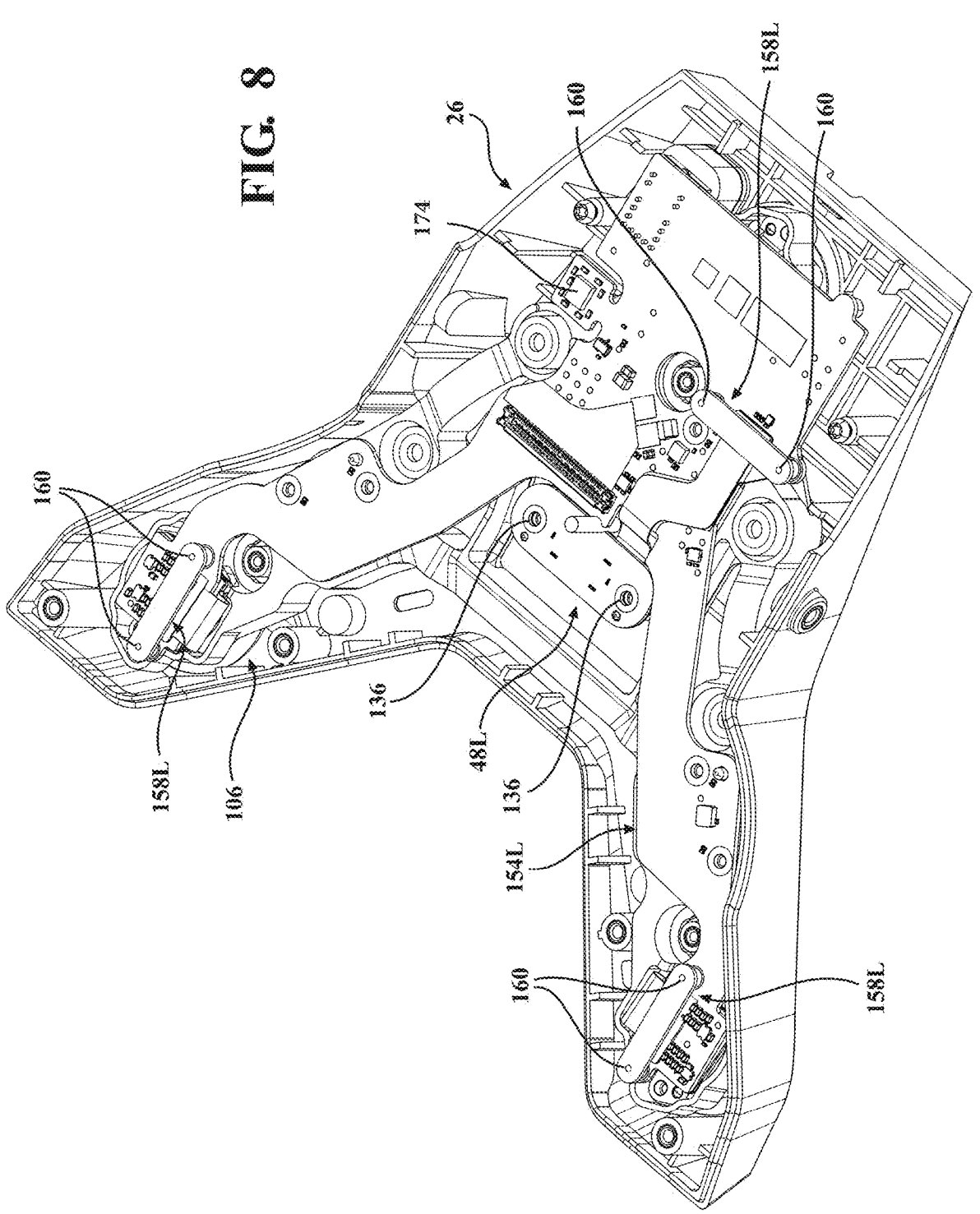
FIG. 8 is a top, perspective view of the lower canopy shown separated from the UAV.
Figures 10, 11:
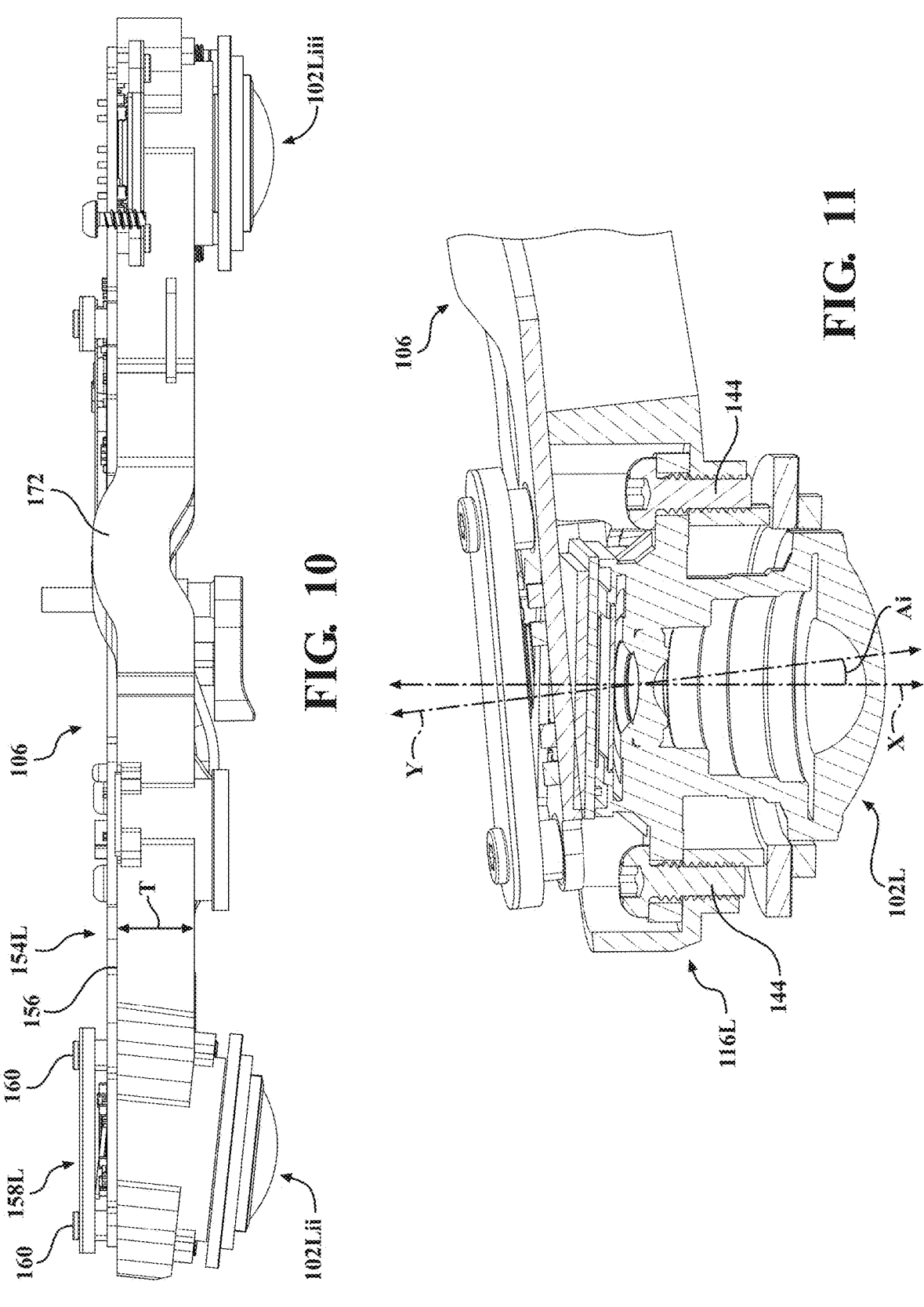
FIG. 10 is a side, plan view of the lower frame and the lower image capture assemblies.
FIG. 11 is a cross-sectional view taken along line 11-11 in FIG. 9.
Figure 12:
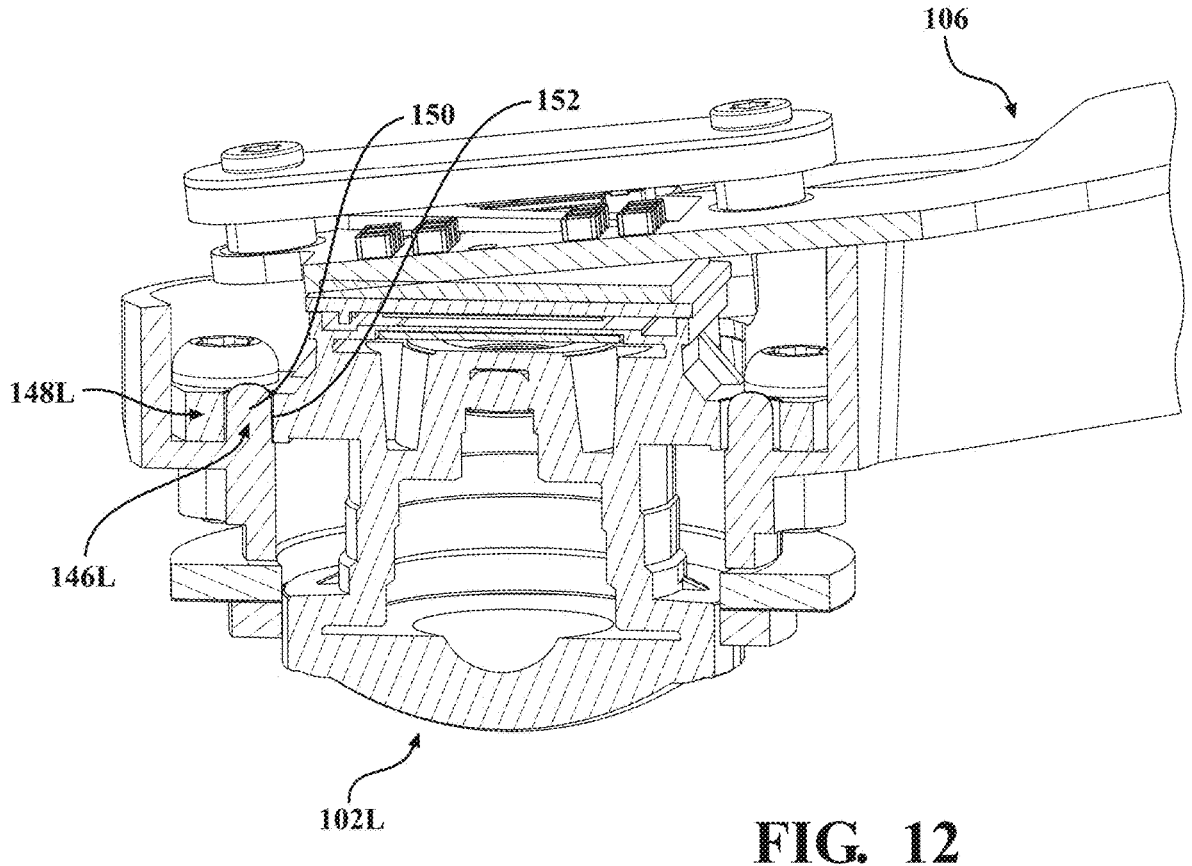
FIG. 12 is a cross-sectional view illustrating corresponding alignment members on the lower frame and one of the lower image capture assemblies.
Figure 13:
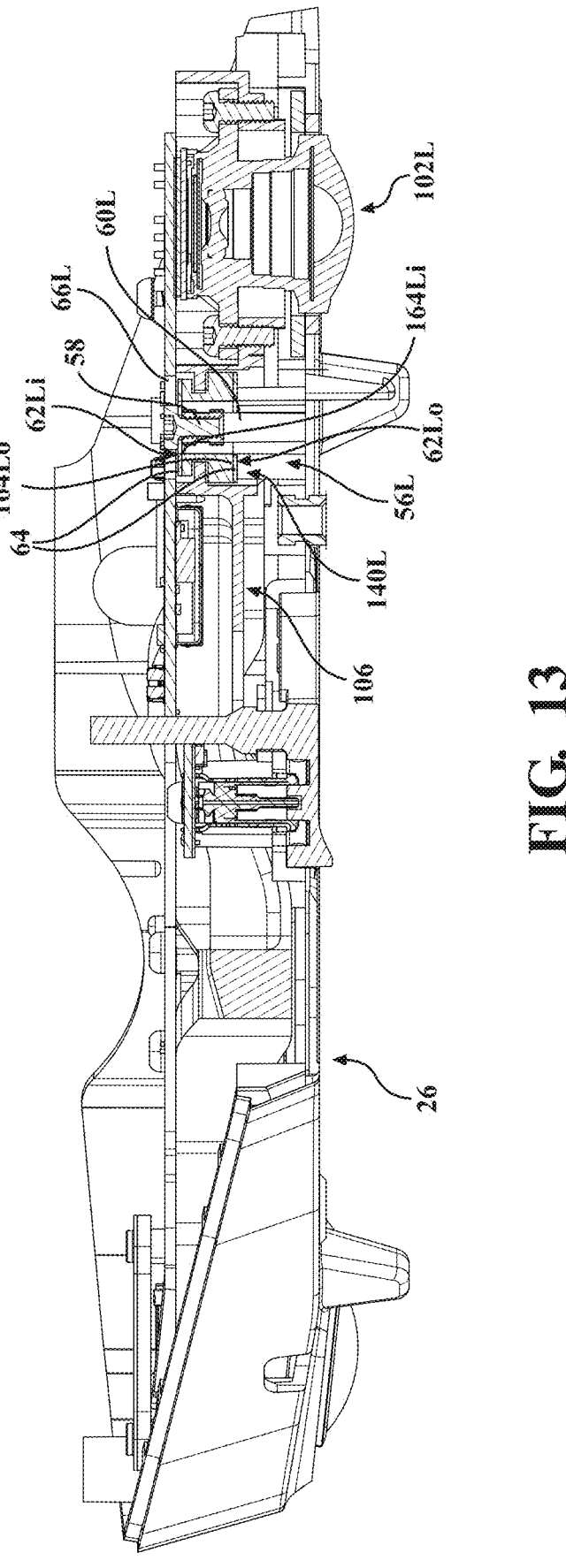
FIG. 13 is a partial, axial (longitudinal, horizontal) cross-sectional view illustrating connection of the lower frame to the lower canopy.
Figure 14:
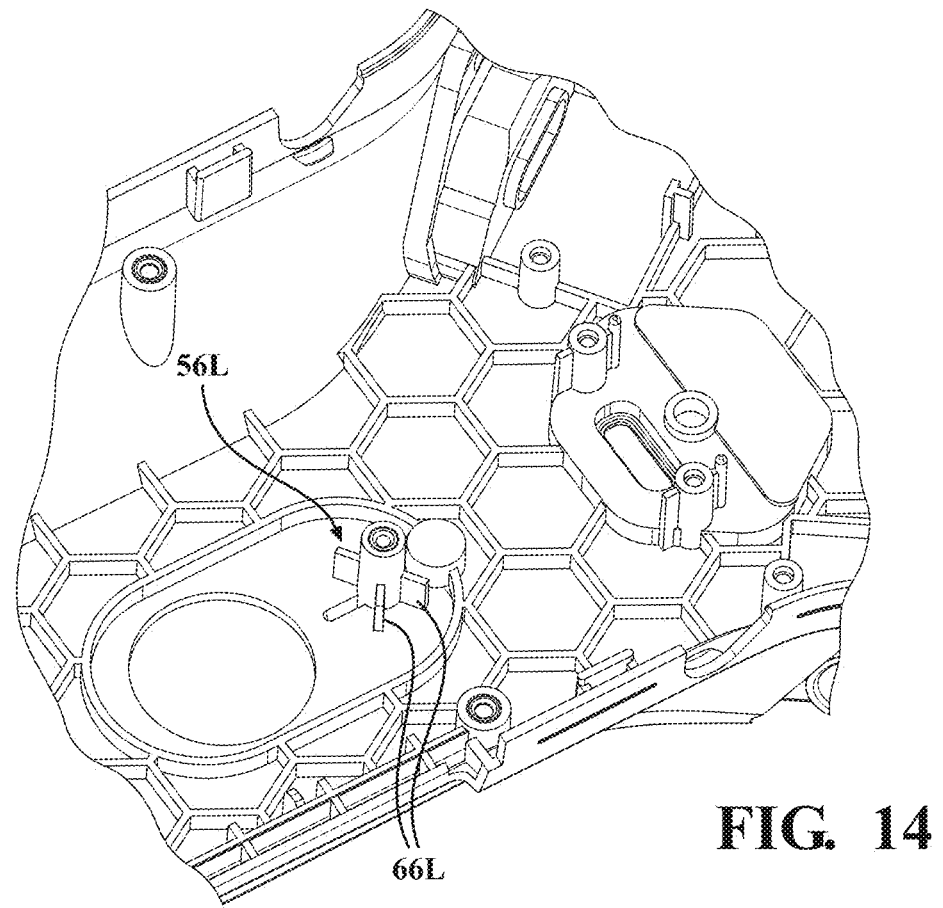
FIG. 14 is a partial, top, perspective view of the lower canopy.

With reference now to FIGS. 8 and 10, the UAV 10 includes a lower vision management circuit board 154L, which is in electrical communication with the plurality of lower image capture assemblies 102L in order to facilitate the communication of data and/or power to and/or from the lower image capture assemblies 102L. The lower vision management circuit board 154L is supported by (secured, connected to) an inner face (side) 156 of the lower frame 106, which conceals and protects the lower vision management circuit board 154L within the UAV 10. In order to establish and maintain proper electrical communication between the lower image capture assemblies 102L and the lower vision management circuit board 154L, the UAV 10 includes a plurality of lower brackets 158L. The lower brackets 158L receive a plurality of mechanical fasteners 160, which extend through the lower vision management circuit board 154L in order to inhibit (if not entirely prevent) disconnection of the lower image capture assemblies 102L therefrom (e.g., a loss of electrical communication between the lower vision management circuit board 154L and the lower image capture assemblies 102L) as a result of vibration or other such movement during operation of the UAV 10, contact of the UAV 10 with an external object, etc.

The lower frame 106 is supported by the lower canopy 26 and is indirectly secured (connected) thereto such that the lower frame 106 and, thus, the lower image capture assemblies 102L, are isolated from the body 18 of the UAV 10 (e.g., the lower canopy 26 and the front chassis 30). More specifically, the lower canopy 26 includes a plurality of (lower) bosses 56L (FIGS. 13, 14) that extend inwardly therefrom (e.g., towards the upper canopy 28), which correspond in number to and support the dampers 140L. More specifically, the bosses 56L extend through openings 162 (FIG. 9) in the dampers 140L such that the dampers 140L extend about (around) bosses 56L. The dampers 140L thus support the lower frame 106 and are positioned between and separate the lower frame 106 from the lower canopy 26, thereby inhibiting (if not entirely preventing) force transmission to the plurality of lower image capture assemblies 102L during operation of the UAV 10.

It is envisioned that bosses 56L and the dampers 140L may be configured such that the bosses 56L are received in the openings 162 in an interference fit. In order to further secure the dampers 140L in relation to the lower canopy 26, it is envisioned that the dampers 140L and the bosses 56L may be (mechanically) secured (connected) together. More specifically, in the illustrated embodiment, the dampers 140L are secured (connected) to the bosses 56L via mechanical fasteners 58 (e.g., screws, pins, rivets, clips, etc.), which extend into (through) the dampers 140L and into axial channels 60L that are defined by the bosses 56L.

In order to enhance the connection between the dampers 140L and the lower canopy 26, it is envisioned that at least one (one or more) retainers 62L (e.g., washers 64) may be positioned between the mechanical fasteners 58 and the dampers 140L and/or between the dampers 140L and the bosses 56L. For example, in the illustrated embodiment, the UAV 10 includes respective inner and outer retainers 62Li, 62Lo, which are positioned on opposite sides (e.g., respective inner and outer faces 164Li, 164Lo) of the dampers 140L. More specifically, the inner retainers 62Li are positioned between the dampers 140L and ribs 66L that extend radially outward from bosses 56L, and the outer retainers 62Lo are positioned between the dampers 140L and the mechanical fasteners 58. The dampers 140L are thus rendered captive between the mechanical fasteners 58 and the bosses 56L, whereby the lower frame 106 is devoid of any direct connection to either the lower canopy 26 or the front chassis 30 and is suspended within the UAV 10.

Suspending the lower frame 106 within the UAV 10 isolates the lower frame 106 and, thus, the lower image capture assemblies 102L, from forces that are applied to the body 18 (FIG. 1) during operation of the UAV 10 (e.g., torsional, shear, or other such forces that are applied to the front chassis 30 via the front arms 22F and the front propeller assemblies 24F). It is envisioned that the dampers 140L may experience deformation (e.g., compression and expansion) under the influence of the forces applied to the body 18, which may result in displacement of the lower frame 106 within the UAV 10. Due to the rigid construction of the lower frame 106, however, relative movement between the lower image capture assemblies 102L is inhibited (if not entirely prevented) during operation of the UAV 10, which allows for accurate triangulation of the lower capture assemblies 102L and reduces image distortion (e.g., pixel error) that may otherwise occur.

Figure 17:
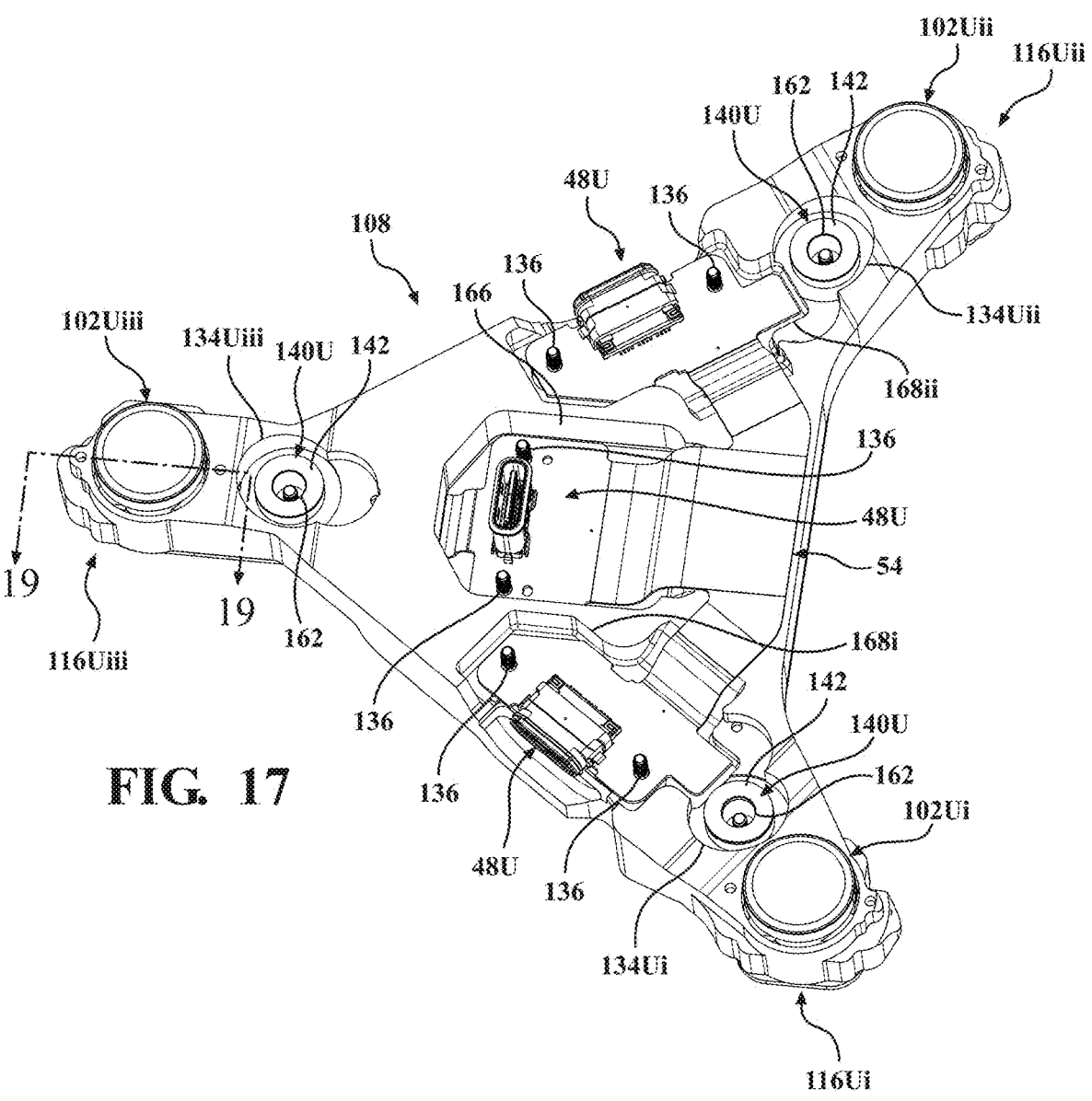
FIG. 17 is a top, perspective view of an upper frame, which supports the plurality of upper image capture assemblies.

With reference now to FIGS. 15-21, the upper frame 108 will be discussed, which is rigid in construction and supports the upper image capture assemblies 102U. As seen in FIG. 17, the upper frame 108 is generally triangular in configuration and defines a (first) apex 116Ui; a (second) apex 116Uii; and a (third) apex 116Uiii.

The upper frame 108 includes: a (second, upper) window 166, which extends (entirely) through the upper frame 108; at least one (one or more) reliefs 168, which extend into the upper frame 108; and a plurality of (second, lower) receptacles 134U, which are configured to receive a plurality of (second, upper) dampers 140U such that the dampers 140U extend into the upper frame 108 via the receptacles 134U.

The window 166 and the relief(s) 168 are configured to accommodate (receive) the upper accessory port(s) 46U (FIGS. 2, 6), the corresponding upper electrical connector(s) 48U, and the accessory circuit board 54. More specifically, the upper electrical connector(s) 48U are supported by (e.g., hard-mounted to) the upper canopy 28 by at least one (one or more) of the aforementioned mechanical fasteners 136 (FIGS. 15, 17), as discussed above in connection with the lower frame 106, and the accessory circuit board 54 is configured so as to extend about the upper frame 108, as seen in FIG. 17.

As discussed above in connection with the lower frame 106, the dampers 140U are configured to further inhibit (if not entirely prevent) force transmission to the upper frame 108 and, thus, the upper image capture assemblies 102U, by absorbing forces that are applied to the UAV 10 during operation (e.g., flight), as described in further detail below.

It is envisioned that the dampers 140U may be secured within the receptacles 134U and connected to the upper frame 108 in any suitable manner. For example, in the illustrated embodiment, the dampers 140U are mechanically secured within the receptacles 134U in an interference fit, as seen in FIG. 17. It is envisioned, however, that the mechanical connection between the dampers 140U and the receptacles 134U may be supplemented by at least one (one or more) mechanical fasteners (e.g., such that the mechanical fasteners extend through the upper frame 108 and into the dampers 140U) and/or replaced by an adhesive connection.

With reference again to FIG. 17 in particular, in the illustrated embodiment, the upper frame 108 includes: a single window 166; two reliefs 168i, 168ii; and three receptacles 134Ui, 134Uii, 134Uiii. More specifically, the reliefs 168i, 168ii are positioned radially outward of the window 166 in adjacent relation thereto, and the receptacles 134Ui, 134Uii, 134Uiii and the corresponding dampers 140U are located (positioned) adjacent to the upper image capture assemblies 102Ui, 102Uii, 102Uiii and the apex 116Ui, the apex 116Uii, and the apex 116Uiii, respectively. It should be appreciated, however, that the particular number of windows 166 and reliefs 168 may be varied in alternate embodiments without departing from the scope of the present disclosure (e.g., depending upon the specific number of upper accessory port(s) 46U included on the UAV 10).

The upper image capture assemblies 102U are supported by (e.g., secured, connected to) the upper frame 108 at (adjacent to) the apices 116U. More specifically, the upper image capture assemblies 102U are hard-mounted to the upper frame 108 by the aforementioned mechanical fasteners 144, which extend through the upper image capture assemblies 102U and into the upper frame 108. Connecting the upper image capture assemblies 102U to the upper frame 108 separates the upper image capture assemblies 102U from the body 18 of the UAV 10 (e.g., the upper canopy 28 and the rear chassis 32), which inhibits (if not entirely prevents) relative movement between the upper image capture assemblies 102U during operation of the UAV 10, as described in further detail below.

In order to facilitate proper orientation of the upper image capture assemblies 102U in relation to the upper frame 1081, it is envisioned that the upper frame 1081 and the upper image capture assemblies 102U may include corresponding alignment members 146U, 148U (FIG. 20), respectively. More specifically, in the illustrated embodiment, the upper frame 108 and the upper image capture assemblies 102 include the aforementioned projections 150 and recesses 152, respectively.

Figure 19:
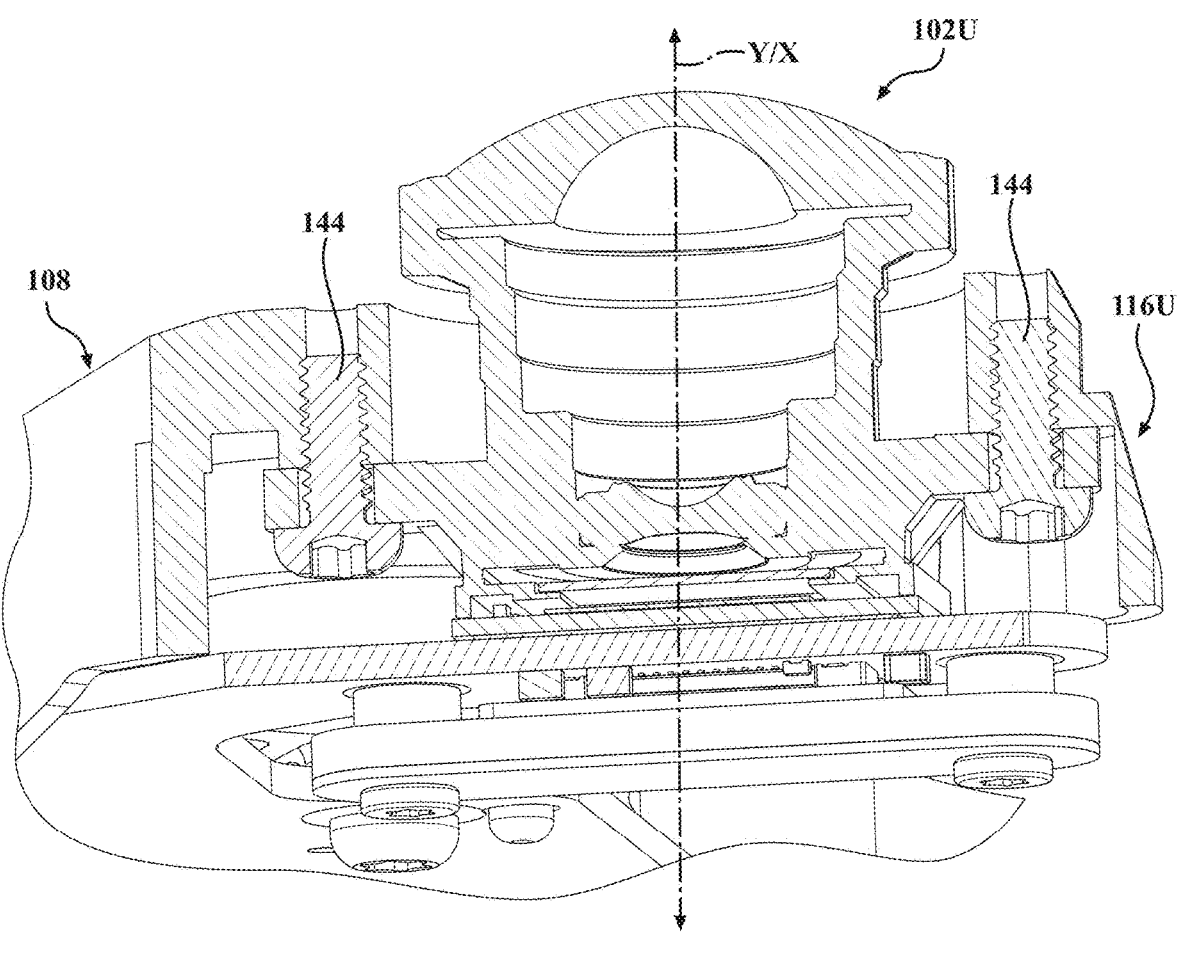
FIG. 19 is a cross-sectional view taken along line 19-19 in FIG. 17.
Figure 20:
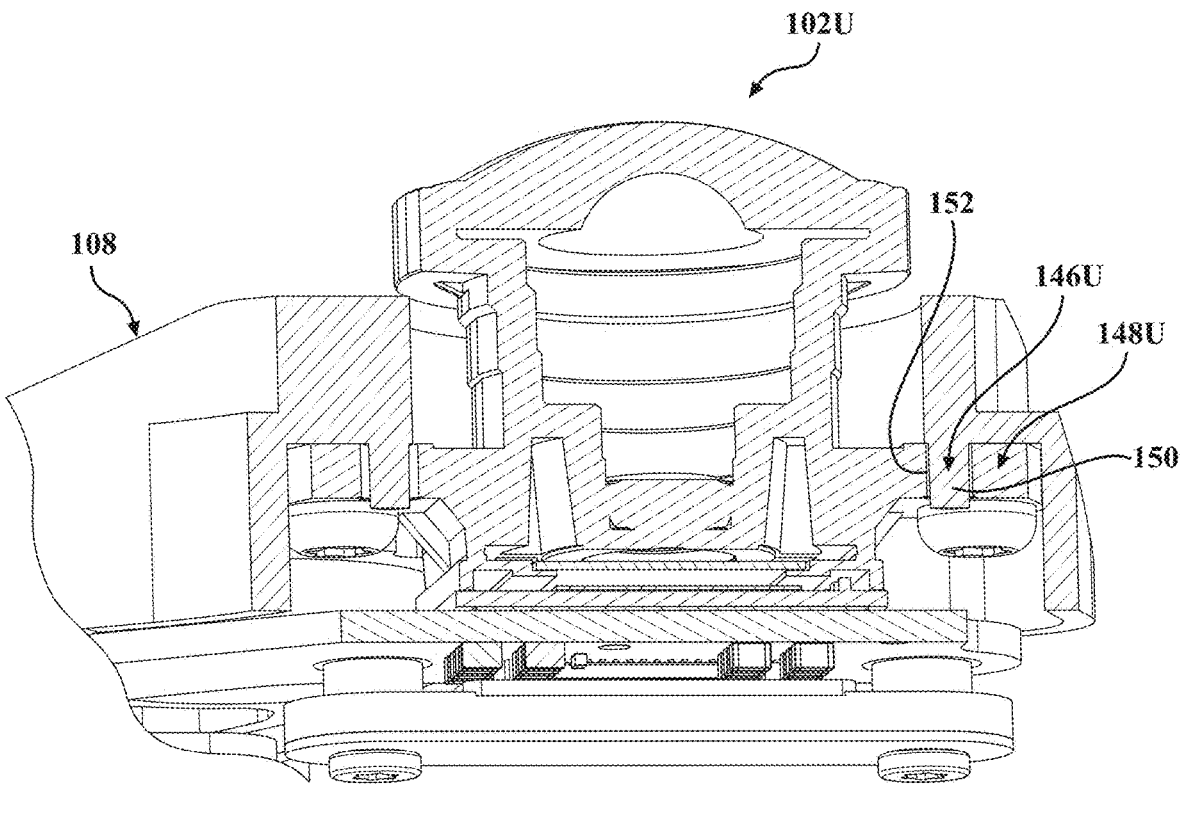
FIG. 20 is a cross-sectional view illustrating corresponding alignment members on the upper frame and one of the upper image capture assemblies.
Figure 21:
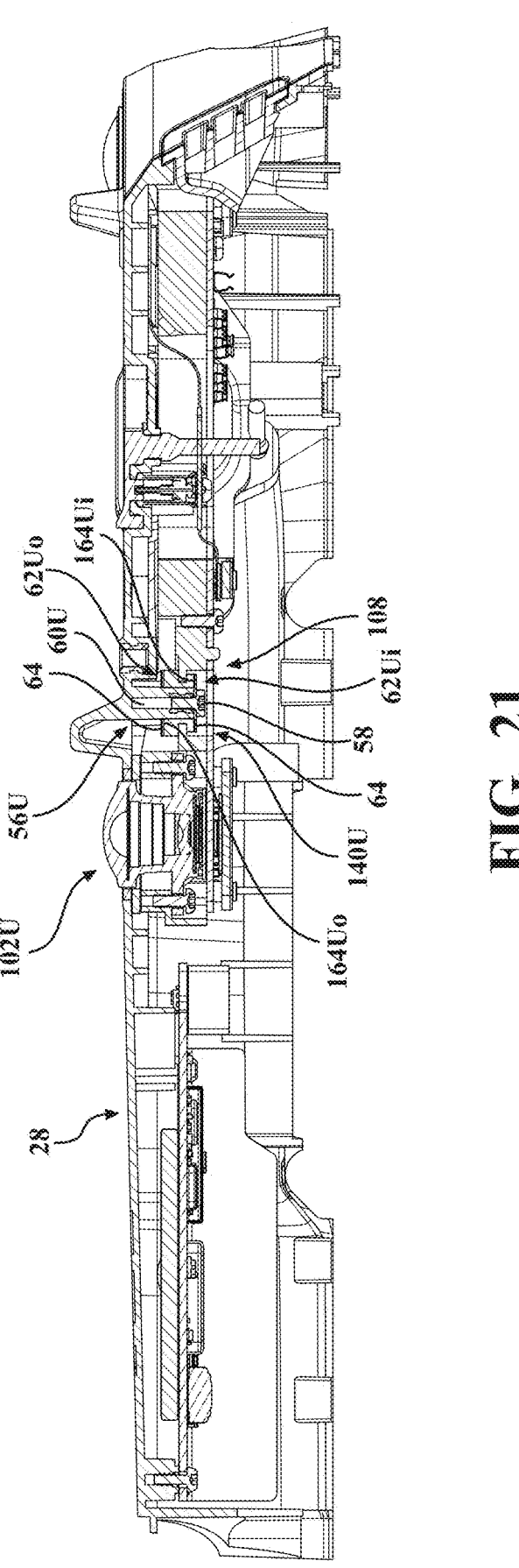
FIG. 21 is a partial, axial (longitudinal, horizontal) cross-sectional view illustrating connection of the upper frame to the upper canopy.

It is envisioned that the each of the upper image capture assemblies 102U may be secured (connected) to the upper frame 108 such that the optical axes X defined thereby extend in generally parallel relation to the axis Y, as seen in FIG. 19. Alternatively, it is envisioned that at least one (one or more) of the upper image capture assemblies 102U may be secured (connected) to the upper frame 108 such that the corresponding optical axis X extends in generally non-parallel relation to the axis Y (e.g., at the aforementioned angle Ai (FIG. 11)), as discussed above in connection with the lower frame 106.

Figure 15:
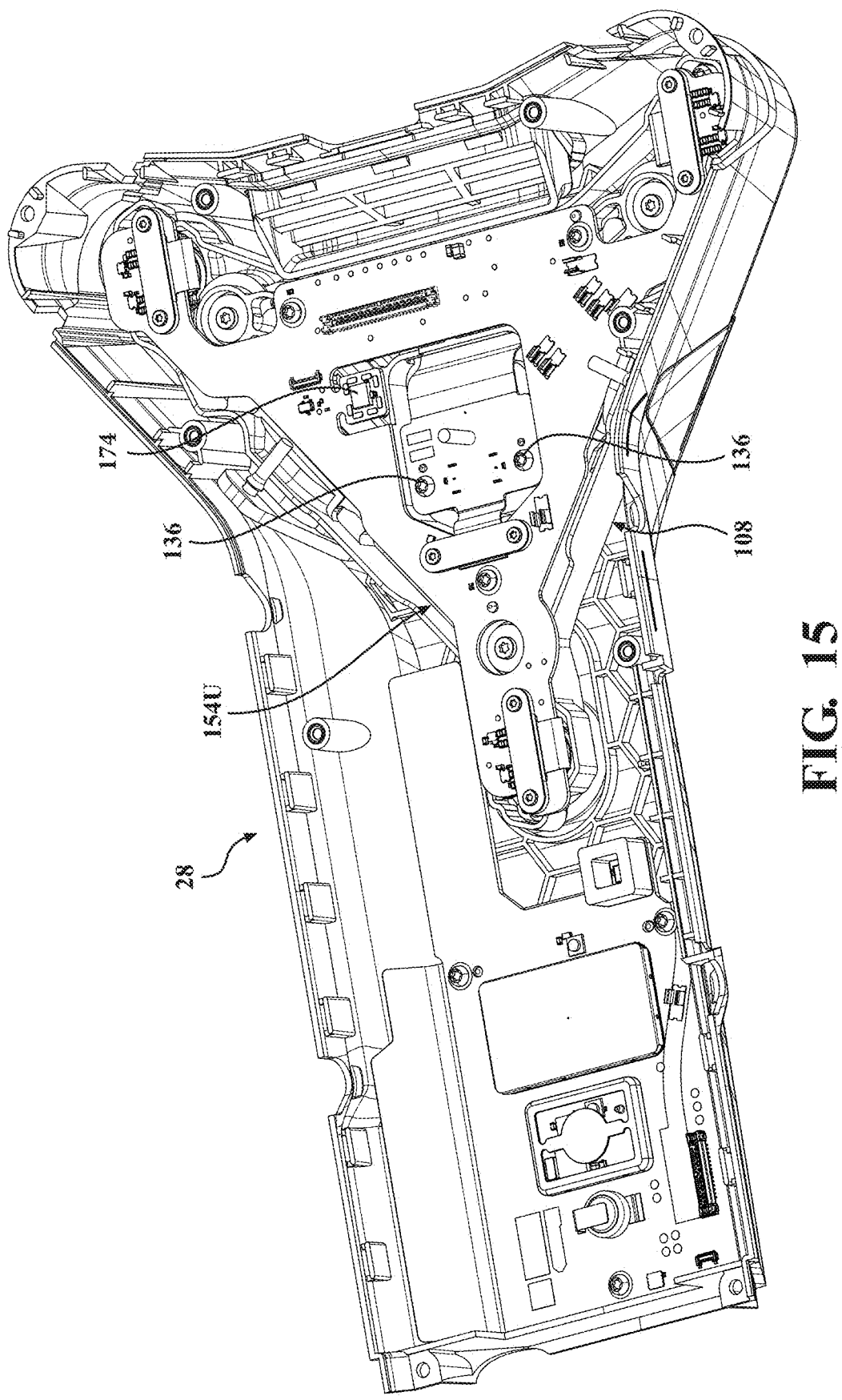
FIG. 15 is a bottom, perspective view of the upper canopy shown separated from the UAV.
Figure 16:
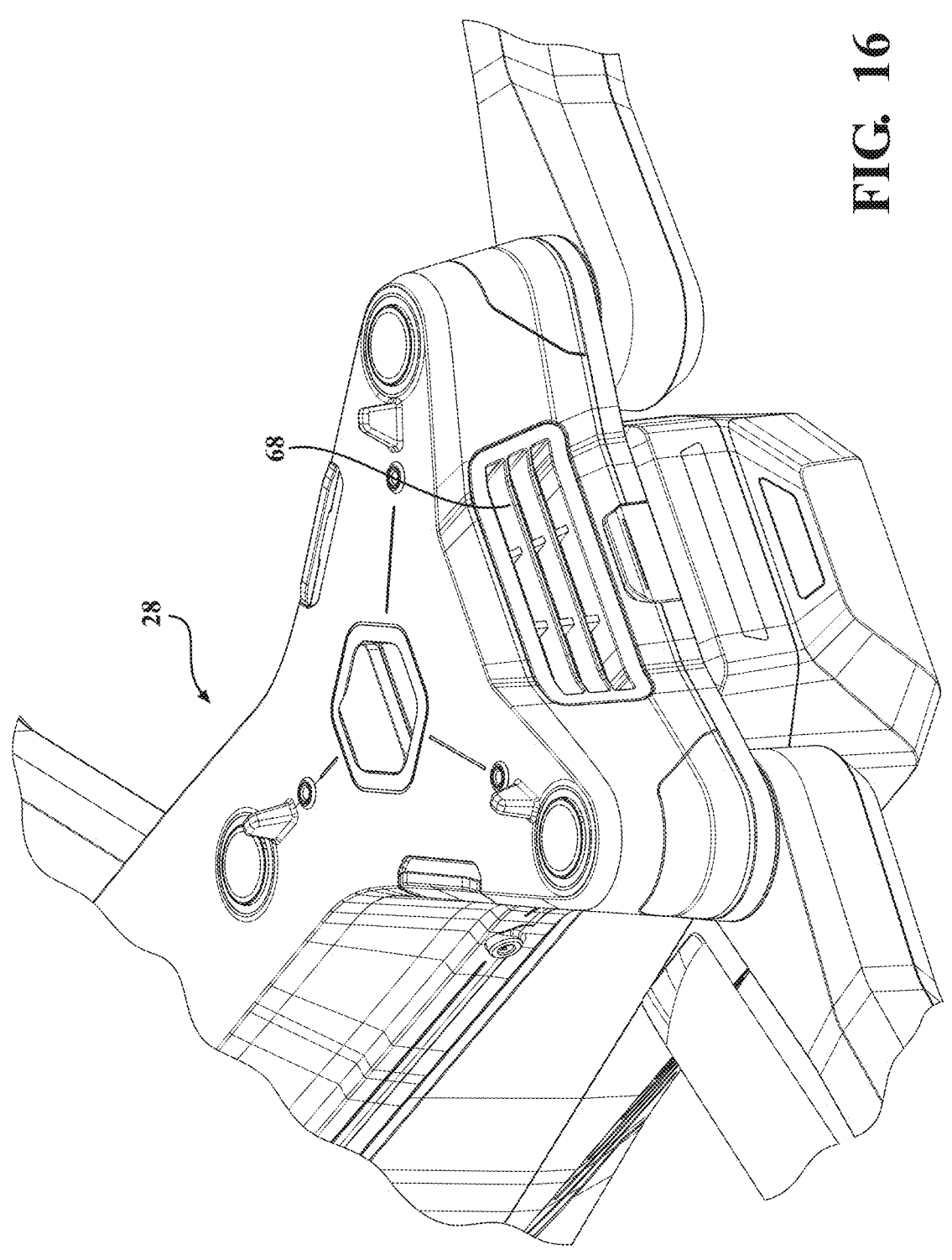
FIG. 16 is a partial, top, rear, perspective view of the UAV.
Figure 18:
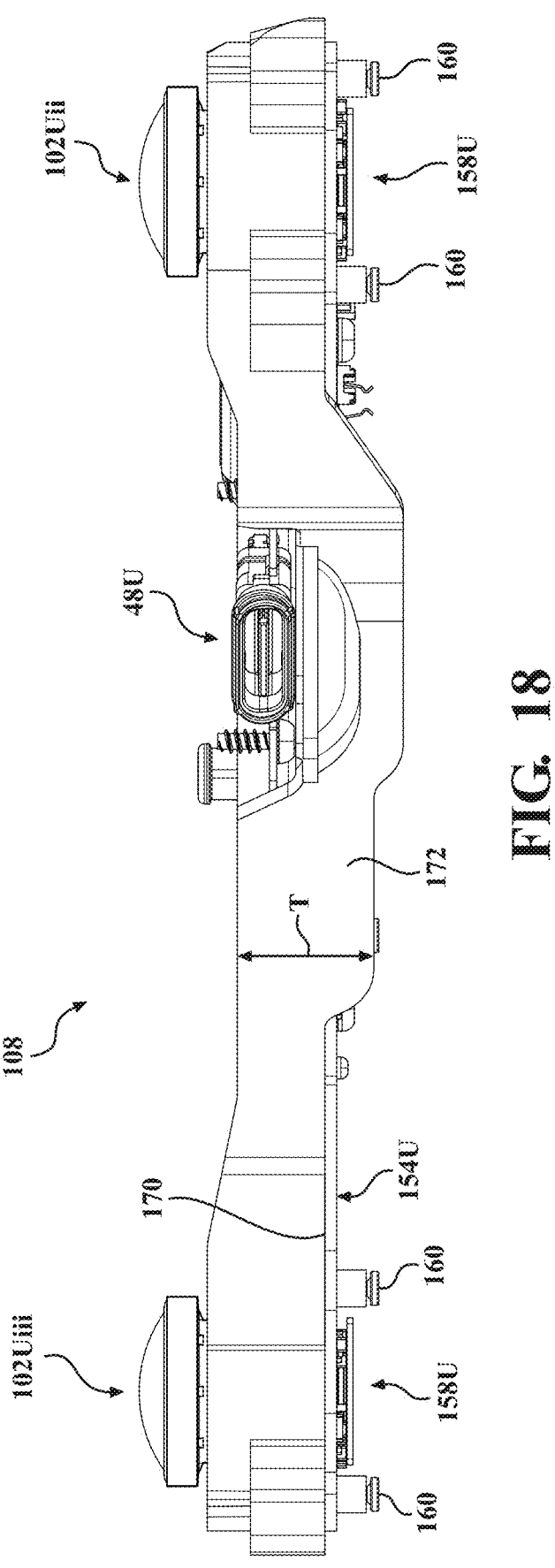
FIG. 18 is a side, plan view of the upper frame and the upper image capture assemblies.

With reference now to FIGS. 15 and 18, the UAV 10 includes an upper vision management circuit board 154U, which is in electrical communication with the plurality of upper image capture assemblies 102U in order to facilitate the communication of data and/or power to and/or from the upper image capture assemblies 102U and/or the communication of data and/or power between the upper image capture assemblies 102U and the main logic board (not shown) in the UAV 10. The upper vision management circuit board 154U is supported by (secured, connected to) an inner face (side) 170 of the upper frame 108, which conceals and protects the upper vision management circuit board 154U within the UAV 10. The upper vision management circuit board 154U is also in electrical communication with the accessory circuit board 54, which facilitates the communication of data and/or power between the upper electrical connector(s) 48U and the main logic board (not shown) in the UAV 10 through the upper vision management circuit board 154U. The accessory circuit board 54 is thus operatively connected to the main logic board (not shown) via the upper vision management circuit board 154U such that electrical signals from the accessory circuit board 54 are routed to the main logic board (not shown) therethrough.

In order to establish and maintain proper electrical communication between the upper image capture assemblies 102L and the upper vision management circuit board 154U, the UAV 10 includes a plurality of upper brackets 158U. The upper brackets 158U receive a plurality of the aforementioned mechanical fasteners 160, which extend through the upper vision management circuit board 154U in order to inhibit (if not entirely prevent) disconnection of the upper image capture assemblies 102U therefrom (e.g., a loss of electrical communication between the lower vision management circuit board 154 and the lower image capture assemblies 102L) as a result of vibration or other such movement during operation of the UAV 10, contact of the UAV 10 with an external object, etc.

The upper frame 108 is supported by the upper canopy 28 and is indirectly secured (connected) thereto such that the upper frame 108 and, thus, the upper image capture assemblies 102U, are isolated from the body 18 of the UAV 10 (e.g., the upper canopy 28 and the rear chassis 32). More specifically, the upper canopy 28 includes a plurality of (upper) bosses 56U (FIG. 21) that extend inwardly therefrom (e.g., towards the lower canopy 26), which correspond in number to and support the dampers 140U. More specifically, the bosses 56U extend through the dampers 140U (via the openings 162 (FIG. 17)) such that the dampers 140U extend about (around) the bosses 56U. The dampers 140U thus support the upper frame 108 and are positioned between and separate the upper frame 108 from the upper canopy 28, thereby inhibiting (if not entirely preventing) force transmission to the plurality of upper image capture assemblies 102U during operation of the UAV 10.

It is envisioned that bosses 56U and the dampers 140U may be configured such that the bosses 56U are received in the openings 162 in an interference fit. In order to further secure the dampers 140U in relation to the upper canopy 28, it is envisioned that the dampers 140U and the bosses 56U may be (mechanically) secured (connected) together. More specifically, in the illustrated embodiment, the dampers 140U are secured (connected) to the bosses 56U via the aforementioned mechanical fasteners 58, which extend into (through) the dampers 140U and into axial channels 60U that are defined by the bosses 56U.

In order to enhance the connection between the dampers 140U and the upper canopy 28, it is envisioned that at least one (one or more) retainers 62U (e.g., the aforementioned washers 64) may be positioned between the mechanical fasteners 58 and the dampers 140U and/or between the dampers 140U and the bosses 56U. For example, in the illustrated embodiment, the UAV 10 includes respective inner and outer retainers 62Ui, 62Uo, which are positioned on opposite sides (e.g., respective inner and outer faces 164Ui, 164Uo) of the dampers 140U in the manner discussed above with respect to the dampers 140L and the lower canopy 26 (e.g., such that the dampers 140U are rendered captive between the mechanical fasteners 58 and the bosses 56U, whereby the upper frame 108 is devoid of any direct connection to either the upper canopy 28 or the rear chassis 32 and is suspended within the UAV 10).

Suspending the upper frame 108 within the UAV 10 isolates the upper frame 108 and, thus, the upper image capture assemblies 102U, from forces that are applied to the body 18 (FIG. 1) during operation of the UAV 10 (e.g., torsional, shear, or other such forces that are applied to the rear chassis 32 via the rear arms 22R and the rear propeller assemblies 24R). It is envisioned that the dampers 140U may experience deformation (e.g., compression and expansion) under the influence of the forces applied to the body 18, which may result in displacement of the upper frame 108 within the UAV 10. Due to the rigid construction of the upper frame 108, however, relative movement between the upper image capture assemblies 102U is inhibited (if not entirely prevented) during operation of the UAV 10, thereby reducing image distortion that may otherwise occur, as discussed above in connection with the lower frame 106.

It is envisioned that the frames 106 (FIG. 9, 10), 108 (FIGS. 17, 18) may include (e.g., may be formed from) any suitable material or combination of materials, whether similar (e.g., identical) or dissimilar. For example, in the illustrated embodiment, the frames 106, 108 each include (e.g., are formed partially or entirely from) cast magnesium. The inclusion of magnesium increases the strength and the rigidity of the frames 106, 108 when compared to other materials (e.g., aluminum, stainless steel, etc.), which further inhibits (if not entirely prevents) relative movement between the upper image capture assemblies 102U and relative movement between the lower image capture assemblies 102L. Additionally, it is envisioned that the inclusion of magnesium may facilitate the establishment of a Faraday cage for at least one (one or more) internal electronic components of the UAV 10 that reduces (if not entirely eliminates) EMI and/or RFI, as described in further detail below. In order to further increase the strength and/or the rigidity of the UAV 10 in at least one (one or more) areas (e.g., at the rear end 16 thereof), it is envisioned that the lower frame 106 and/or the upper frame 108 may include at least one (one or more) reinforced sections 172 (FIGS. 10, 18) such that the lower frame 106 and/or the upper frame 108 defines a non-uniform thickness T.

In certain embodiments, it is envisioned that the lower frame 106 and/or the upper frame 108 may include (or otherwise support) at least one (one or more) inertial measurement units (IMUs) 174 (FIGS. 8, 15) that are configured to provide positional information about movement of the image capture assemblies 102 (e.g., acceleration, rotation, etc.). While each of the frames 106, 108 is illustrated as supporting a corresponding IMU 174, embodiments in which either or both of the IMUs 174 may be eliminated are also envisioned herein, as are embodiments in which the specific location of either or both of the IMUs 174 may be varied.

The Thermal Management System

Figure 4:
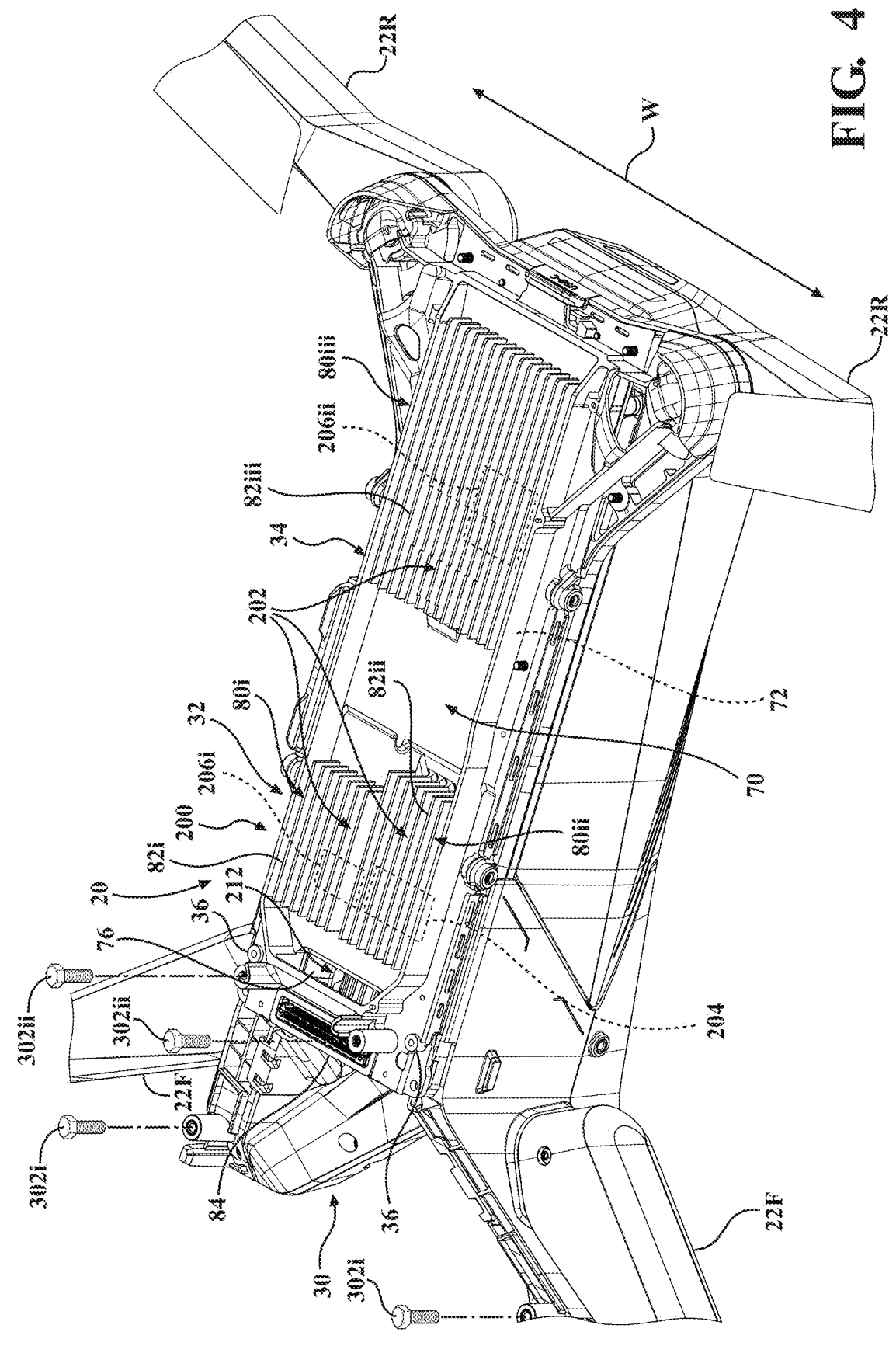
FIG. 4 is a partial, top, perspective view of the UAV illustrating a thermal management system.
Figure 5:
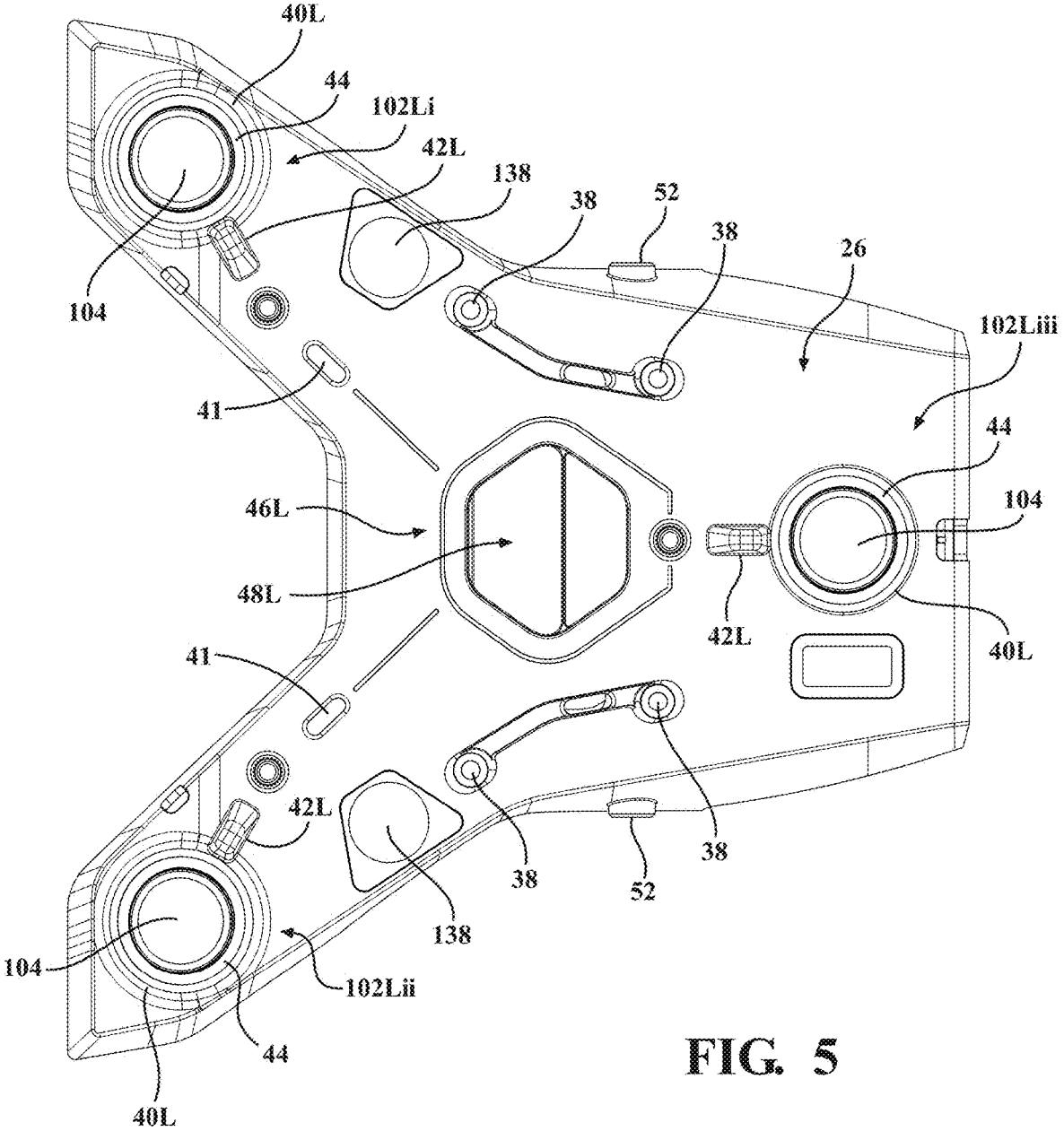
FIG. 5 is a bottom, plan view illustrating a lower canopy of the UAV and a plurality of lower image capture assemblies.
Figure 6:
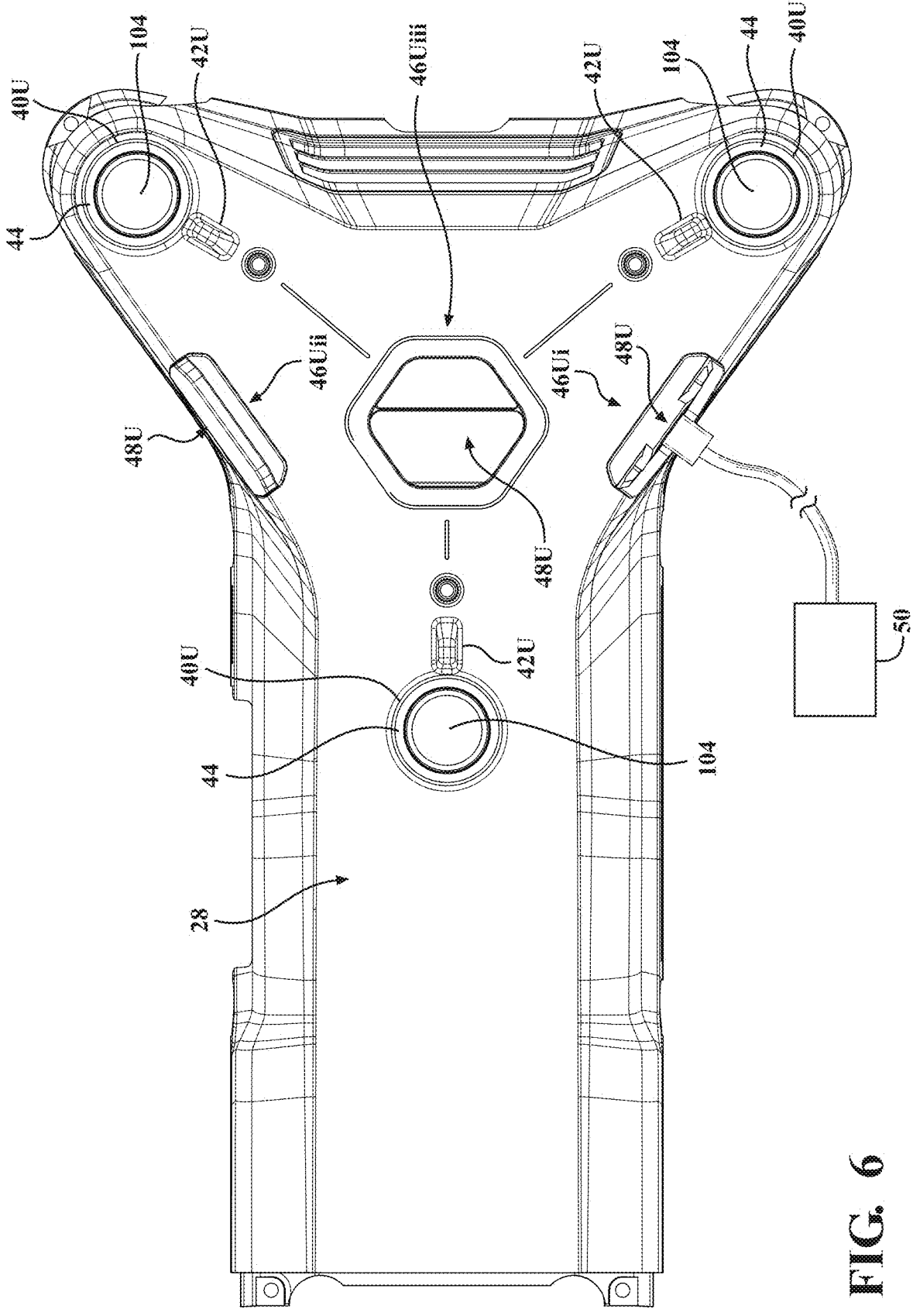
FIG. 6 is a top, plan view illustrating an upper canopy of the UAV and a plurality of upper image capture assemblies.
Figure 22:
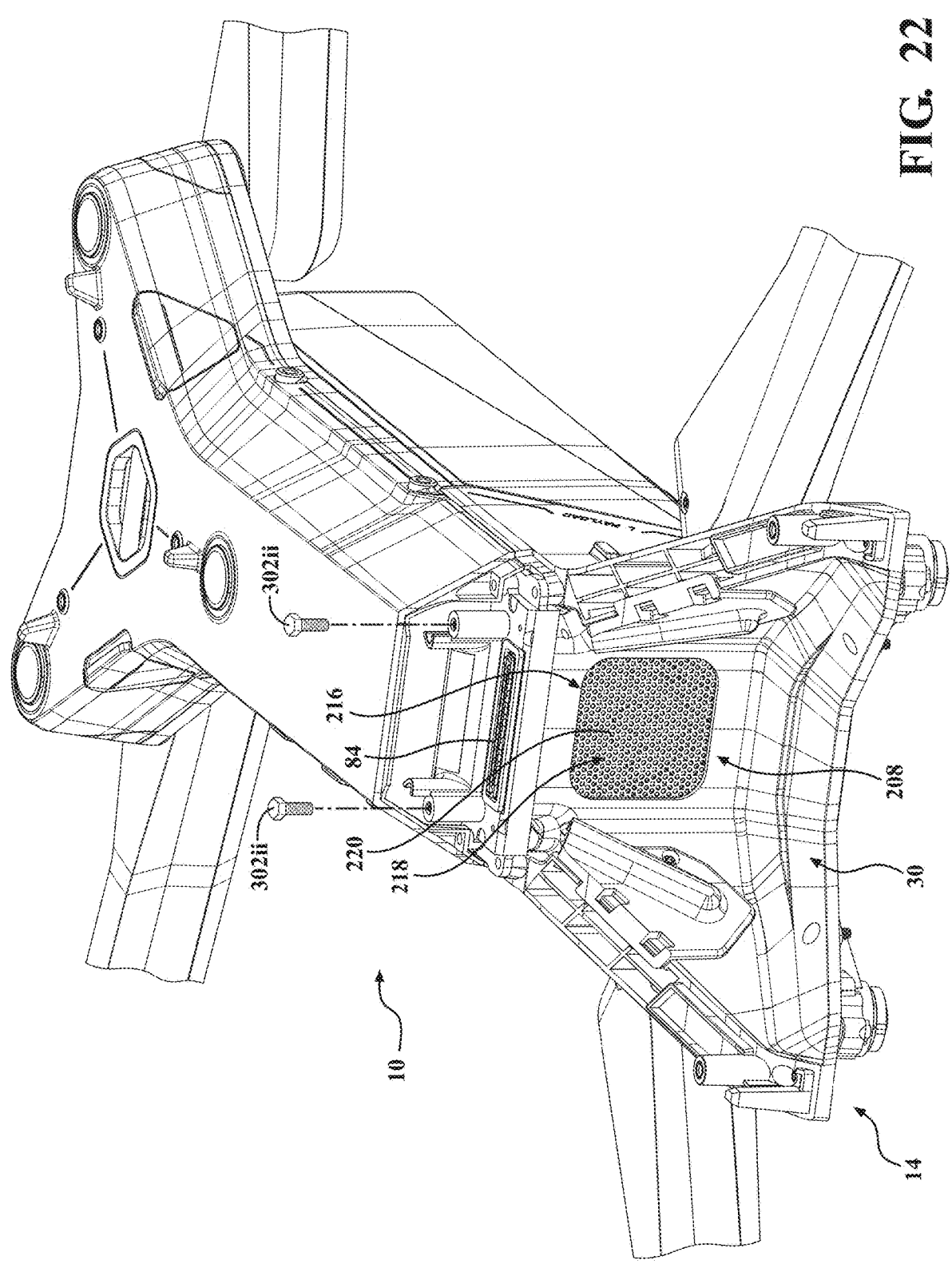
FIG. 22 is a partial, top, front, perspective view of the UAV.
Figure 23:
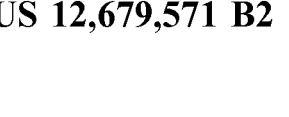
FIG. 23 is an axial (longitudinal, horizontal) cross-sectional view illustrating the thermal management system.

With reference now to FIGS. 4, 22, and 23, the thermal management system 200 will be discussed. The thermal management system 200 regulates and dissipates heat generated during operation of the UAV 10 and is configured to transfer thermal energy away from various heat-generating components 202 in the UAV 10 including, for example, a radio 204 and at least one (one or more) processors 206 (e.g., an image signal processor 206i and a CPU/GPU 206ii), which are supported by the chassis 20 (e.g., the heatsink 34). As described in detail below, the thermal management system includes: an intake port 208 (FIG. 22); an exhaust port 210 (FIG. 7); a blower 212 (e.g., a fan 214); and the heatsink 34, which is provided by the rear chassis 32, as indicated above.

The intake port 208 is defined by the front chassis 30 (e.g., at the front end 14 of the UAV 10) and allows air to be drawn into the UAV 10 via the blower 212 (FIG. 23). More specifically, the intake port 208 is located behind (rearwardly of) the gimbal module 300 (FIG. 2), which allows for the use of a larger blower 212 and tighter, more condensed packaging of the thermal management system 200 and the UAV 10.

In order to inhibit (if not entirely prevent) the entry of dust, debris, etc., into the UAV 10, the UAV 10 includes a filter 216 (FIG. 22) that is positioned about the intake port 208. More specifically, in the illustrated embodiment, the filter 216 includes a mesh material 218 (e.g., a screen 220).

The exhaust port 210 (FIG. 7) is defined by the rear chassis 32 (e.g., at the rear end 16 of the UAV 10) and allows (heated) air to exit the UAV 10. More specifically, the exhaust port 210 is located adjacent to and (vertically) below the upper frame 108, and is covered by the upper canopy 28. In order to allow air to exit the upper canopy 28, the upper canopy 28 includes an exhaust vent 68 (FIG. 16) that is configured in correspondence with the exhaust port 210 such that the exhaust vent 68 overlies the exhaust port 210 upon connection of the upper canopy 28 to the rear chassis 32.

The blower 212 is configured to direct air through the UAV 10 along an airflow path P (FIG. 23) that extends from the intake port 208, into and across (e.g., through) the heatsink 34, and through the exhaust port 210. Positioning of the heatsink 34 along the airflow path P allows the blower 212 to direct air across (through) the heatsink 34 in order to transfer thermal energy away from the processor(s) 206 (FIG. 4) and/or the radio 204 and cool the UAV 10 by removing heat (e.g., via the exhaust port 210).

As seen in FIG. 23, the thermal management system 200 includes a barrier 222 (e.g., a film 224, a seal, etc.) that is secured (connected) to the rear chassis 32. More specifically, the barrier 222 overlies the heatsink 34 such that the airflow path P is enclosed from below by the heatsink 34 and from above by the barrier 222, which further facilitates the removal of heat through the exhaust port 210 by funneling and facilitating linear airflow through the heatsink 34. The barrier 222 provides a thermal insulator that inhibits (if not entirely prevents) the transmission of heat to the upper image capture assemblies 102u, and may include (e.g., may be formed from) any material or combination of materials suitable for that intended purpose. For example, in the illustrated embodiment, the barrier 222 includes polycarbonate.

With continued reference to FIG. 23, the blower 212 is located adjacent to the intake port 208 and positioned immediately rearward thereof, which eliminates the presence of any structures or components (e.g., circuit boards, etc.) between the intake port 208 and the blower 212 so as to facilitate unobstructed airflow through the intake port 208 and into the blower 212. More specifically, the thermal management system 200 is configured such that the blower 212 is spaced axially from the intake port 208 (e.g., along a length L of the UAV 10) by a distance that lies substantially within the range of approximately 0 mm (as illustrated in FIG. 23) to approximately 5 mm.

It is envisioned that the blower 212 may be secured within the UAV 10 in any suitable manner. For example, it is envisioned that the blower 212 may be (mechanically) secured (connected) to the front chassis 30, as illustrated in FIG. 23, and/or to the rear chassis 32 via one or more mechanical fasteners (not shown) (e.g., screws, pins, rivets, clips, etc.), in a press (snap) fit arrangement, via soldering or brazing, etc.

The blower 212 is configured to draw air into the UAV 10 and redirects airflow by approximately 90 degrees in order to route air into and across (through) the heatsink 34, as described in further detail below. More specifically, the blower 212 draws air into the UAV 10 via the intake port 208 along a (first) axis A (FIG. 23), which extends in generally parallel relation to the length L (FIG. 1) of the UAV 10 (and the axis Y), and redirects the air along a (second) axis B, which extends in generally orthogonal (perpendicular) relation to the axis A and in generally parallel relation to the height H (FIG. 1) of the UAV 10 (and the reference axis Y). The configuration and specific positioning of the blower 212 immediately rearward of the intake port 208 establishes a linear (rather than tortuous) airflow path into the blower 212, which increases heat dissipation and cooling of the heatsink 34 and the UAV 10.

The heatsink 34 includes a body 70 (FIG. 4) that supports and conceals the processor(s) 206 and the radio 204, which allows the heatsink 34 to distribute heat away from the processor(s) 206 and the radio 204. More specifically, the processor(s) 206 are hard-mounted (secured) to the heatsink 34 (e.g., via mechanical fasteners) within an internal chamber 72 that is defined by the body 70. The internal chamber 72 is configured to receive the processor(s) 206 such that the processor(s) 206 nest (are housed) within the heatsink 34, which facilitates the establishment of the aforementioned Faraday cage.

In order to support airflow through the UAV 10, the heatsink 34 includes (defines) an internal duct 74 (FIG. 23) with an ingress 76 and an egress 78, which are oriented in generally orthogonal (perpendicular) relation. More specifically, the ingress 76 extends in generally parallel relation to (e.g., is oriented along) the axis A, and the egress 78 extends in generally parallel relation to (e.g., is oriented along) the axis B.

As seen in FIG. 23, the ingress 76 is in communication with the blower 212 such that air flowing along the axis B is directed into the internal duct 74, which re-routes the air along the axis A such that the air flows through the heatsink 34 towards the exhaust port 210, thereby drawing heat away from the processor(s) 206. In order to increase the transfer of heat away from the processor(s) 206 (and/or the radio 204), the heatsink 34 includes one or more cooling arrays 80 (FIG. 4), which include a plurality of fins 82 that extend outwardly from the body 70 (e.g., in generally parallel relation to the height H of the UAV 10 and the axes Y, B) and increase the overall exposed surface area of the heatsink 34.

In certain embodiments, it is envisioned that the body 70 and the fins 82 may be integrally (unitarily, monolithically,) formed (e.g., from a single piece of material, such as magnesium, for example). Embodiments in which the body 70 and the fins 82 may be formed as discrete (separate) components that are connected together (e.g., via soldering or brazing, mechanical engagement, etc.) are also envisioned herein, however, as are embodiments in which the body 70 and the fins 82 may include (e.g., may be formed partially or entirely from) different materials. For example, in one particular embodiment, it is envisioned that the body 70 may include (e.g., may be formed partially or entirely from) magnesium and that the fins 82 may include (e.g., may be formed partially or entirely from) aluminum, which may allow for a reduction in the overall weight of the UAV 10. By forming the body 70 and the fins 82 separately, it is envisioned that the density of the cooling array(s) 80 may be increased (e.g., across a width W (FIG. 4) of the UAV 10), thereby further increasing the transfer of heat away from the processor(s) 206 and/or the radio 204.

In the illustrated embodiment, the heatsink 34 includes: a (first) cooling array 80i with a (first) plurality of fins 82i, which corresponds to and is generally aligned with the image signal processor 206i; a (second) cooling array 80ii with a (second) plurality of fins 82ii, which corresponds to and is generally aligned with the radio 204; and a (third) cooling array 80iii with a (third) plurality of fins 82iii, which corresponds to and is generally aligned with the CPU/GPU 206ii. It should be appreciated, however, that the specific number of cooling arrays 80 may be increased or decreased in alternate embodiments (e.g., depending upon the number of heat-generating components 202 included in the UAV 10) without departing from the scope of the present disclosure.

Additionally, while the cooling arrays 80 are each illustrated as including a generally equivalent distribution of fins 82 (e.g., fin densities that are generally identical), embodiments of the heatsink 34 in which the distribution of fins across the cooling arrays 80 may vary are also envisioned herein (e.g., based upon the thermal requirements of the heat-generating components 202), as are embodiments in which the cooling arrays 80 may be comprised of fins 82 that include (e.g., are formed from) different materials. For example, it is envisioned that the pluralities fins 82*i*, 82*iii* respectively comprising the cooling arrays 80*i*, 80*iii* may include (e.g., may be formed from) a (first) material (e.g., aluminum), and that the plurality of fins 82*ii* comprising the cooling array 80*ii* may include (e.g., may be formed from) a (second) material that is different than the first material (e.g., magnesium).

In certain embodiments of the disclosure, it is envisioned that the UAV 10 may include a dynamic airflow system that is configured to alter airflow through the UAV 10. For example, it is envisioned that the UAV 10 may include one or more baffles (or other such diverters) that are reconfigurable between a plurality of positions in order to redirect air along a variety of airflow paths (e.g., based upon thermal readings within the UAV 10, cooling requirements, operational performance, etc.). In such embodiments, it is envisioned that airflow may be either manually varied (e.g., via the manipulation of one or more levers, toggles, etc.) or automatically varied (e.g., via one or more actuators that are in communication with one or more temperature sensors).

During use and operation of the thermal management system 200 (FIG. 4), air is drawn into the UAV 10 through the filter 216 (FIG. 22) and into the intake port 208 via the blower 212 (FIG. 23) in an unobstructed manner. The blower 212 then redirects the air by approximately 90 degrees (e.g., from flowing axis A to flowing along axis B) such that the air enters the internal duct 74 via the ingress 76 and flows across (through) the heatsink 34 along the airflow path P. As air flows across (through) the heatsink 34, the air is directed about (e.g., across) the cooling arrays 80 (FIG. 4), which distributes heat away from the heat-generating components 202 (e.g., the radio 204 and the processor(s) 206). Heated air is then carried along the airflow path P, being directed by the blower 212, and exits the UAV 10 via the egress 78, the exhaust port 210, and the exhaust vent 68 (FIG. 16) in the upper canopy 28, thereby removing heat from the UAV 10.

The Gimbal Module

With reference now to FIGS. 24-27, the gimbal module 300 will be discussed, which includes: an armature 400; a gimbal assembly 500 that is supported by (e.g., secured (connected) to) the armature 400; and a head assembly 600 that is supported by (e.g., secured (connected) to) the gimbal assembly 500. The gimbal module 300 is configured for removable connection to the body 18 (FIG. 2) of the UAV 10 (e.g., the chassis 20), which allows for repeated connection and disconnection of the gimbal module 300. More specifically, the gimbal module 300 is configured for removable connection to the front and rear chassis 30, 32 (FIG. 4) via a plurality of (first and second) mechanical fasteners 302*i*, 302*ii* (e.g., screws, pins, rivets, clips, etc.), respectively.

The modularity facilitated by the removable connection between the gimbal module 300 and the body 18 of the UAV 10 allows for interchangeability (swapability) of the gimbal module 300 amongst a plurality of gimbal modules 300 with different image capture capabilities, which facilitates more robust usage of the UAV 10 in a variety of use cases (e.g., depending upon the intended use of the UAV 10, the environment in which the UAV 10 will be deployed, etc.). As described in further detail below, the various mechanical and electrical components that support operation of the gimbal module 300 are entirely included (contained, provided for) in the gimbal module 300 itself, rather than within the UAV 10 (e.g., within the logic board or other such suitable location), which allows the data required for calibration of the gimbal module 300 and/or the UAV 10 to be stored internally within the gimbal module 300. Storing the data within the gimbal module 300 itself allows the UAV 10 to establish various operating and/or flight parameters and perform computations prior, during, and subsequent to flight that are specific to the gimbal module 300. For example, depending upon the particular mass of the gimbal module 300, the mechanical and optical capabilities thereof, etc., it is envisioned that the propulsion characteristics of the UAV 10 may be calibrated and/or dynamically altered in order to account for and offset any change to the center of gravity of the UAV 10 realized upon connection of the gimbal module 300. In addition to the particular mass of the gimbal module 300, it is envisioned that other parameters may be stored within the gimbal module 300 as well including, for example, camera intrinsics (e.g., lens properties, resolution, pixel size, etc.), in order to allow for additional adjustments to the propulsion characteristics (e.g., planning and control systems) of the UAV 10.

As indicated above, known UAVs often include one or more optical components (e.g., lenses, cameras, etc.) that are mounted to a gimbal assembly, which is typically located beneath the UAV between the ends thereof. In contrast, the gimbal module 300 is located at the front end 14 of the UAV 10, as seen in FIG. 2, which allows for both increased optical capabilities (visualization) and articulation (movement, repositioning, rotation) of the gimbal module 300, as described in further detail below. More specifically, the gimbal module 300 extends forwardly from the body 18 (e.g., the chassis 20) in cantilevered relation, which supports articulation through an increased range of motion and inhibits (if not entirely prevents) the body 18 from obstructing (entering) a field-of-view FOV (FIGS. 2, 25) of the gimbal module 300. For example, the forward location of the gimbal module 300 and the cantilevering thereof allows for orientation of the gimbal module 300 in a generally vertical, upward position (FIGS. 26, 27), which renders the UAV 10 devoid of any structures or components that are located directly above the gimbal module 300. Orientation of the gimbal module 300 in the generally vertical, upward position thus facilitates the capture of content that is located directly above the UAV 10, such as, for example, when the UAV 10 is utilized to scan a building, a bridge, an aircraft, a tunnel, etc.

Figure 26:
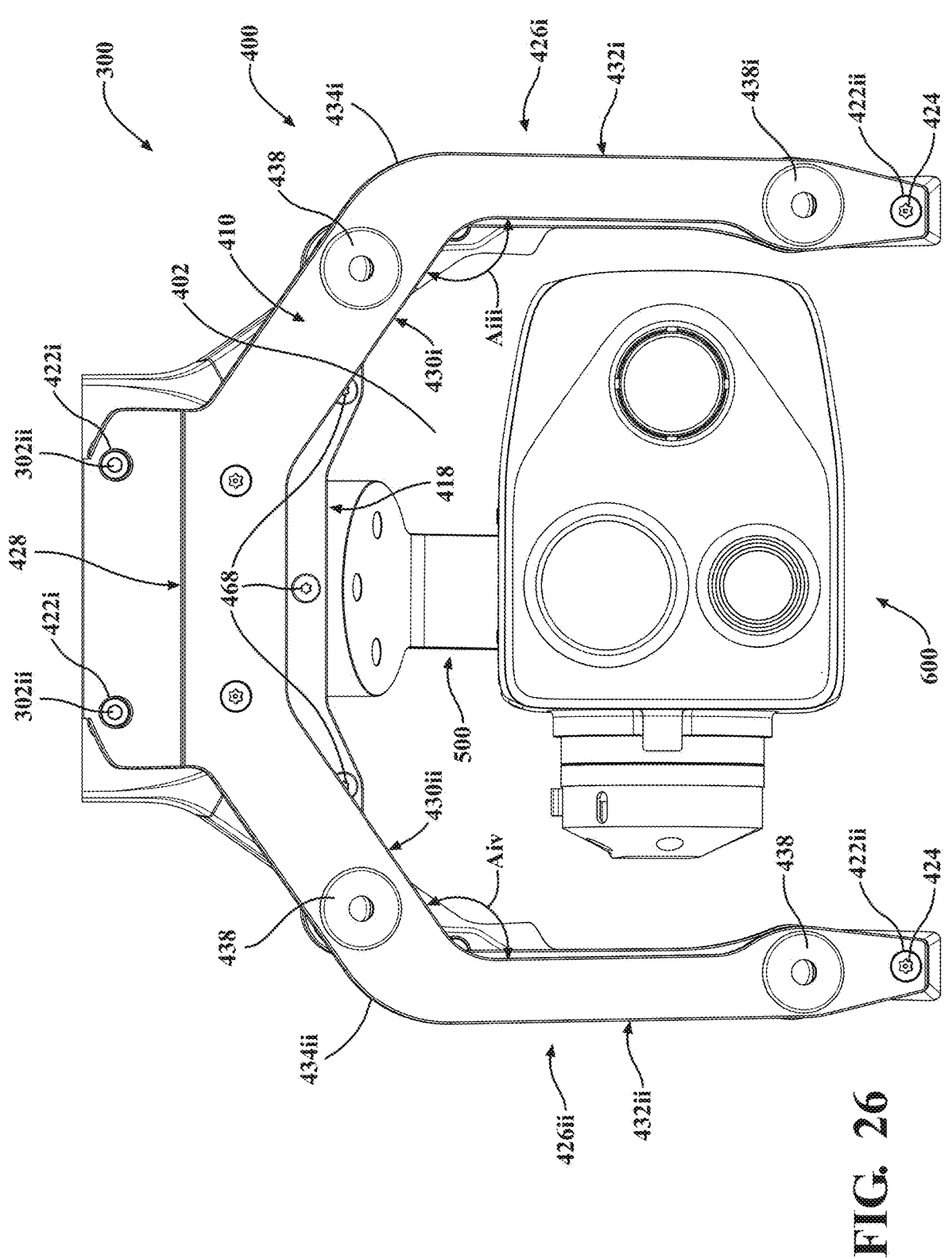
FIG. 26 is a top, plan view of the gimbal module shown in a generally vertical, upward position.
Figure 27:
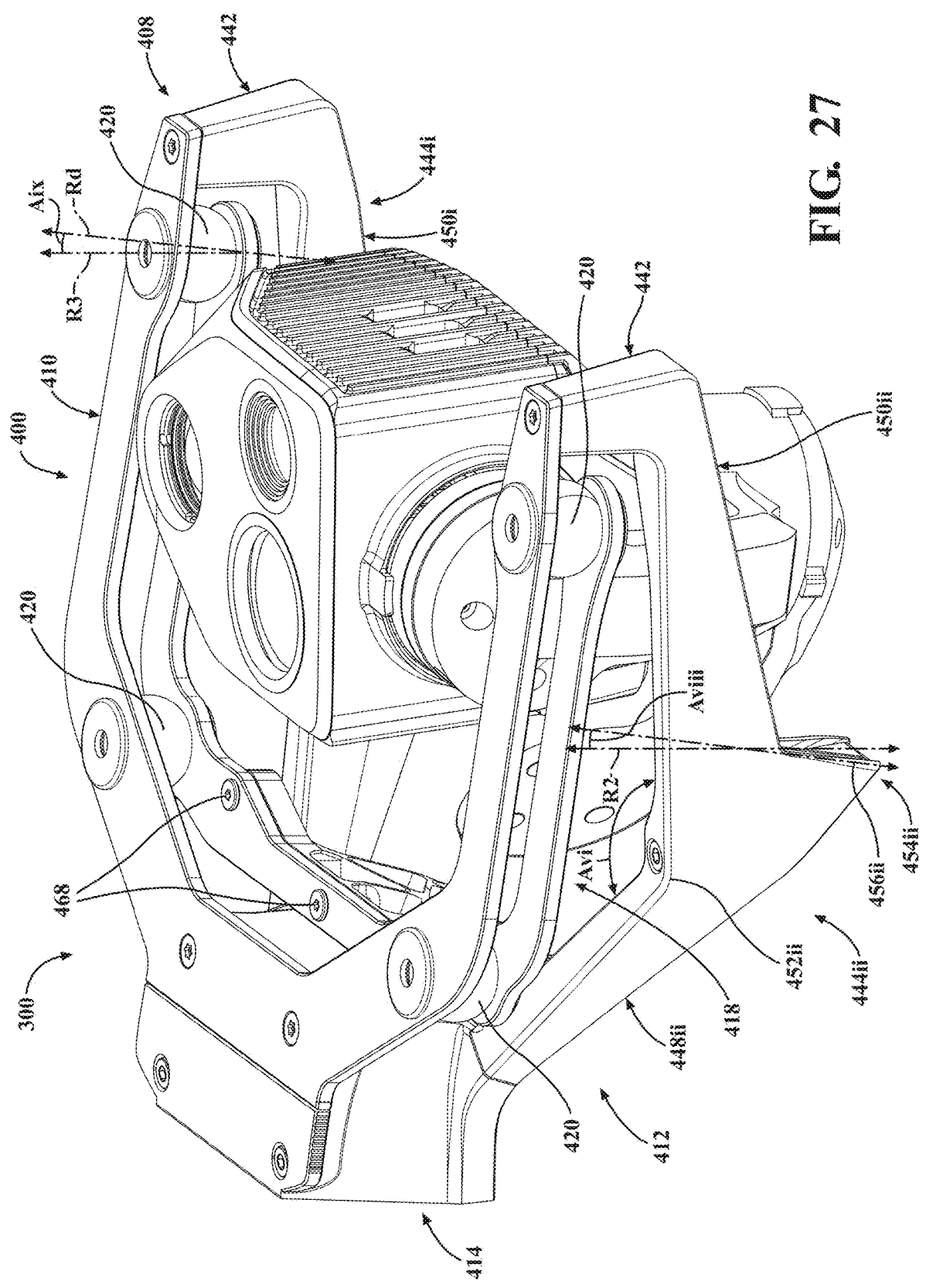
FIG. 27 is a top, front, perspective view of the gimbal module shown in the generally vertical, upward position.
Figure 28:
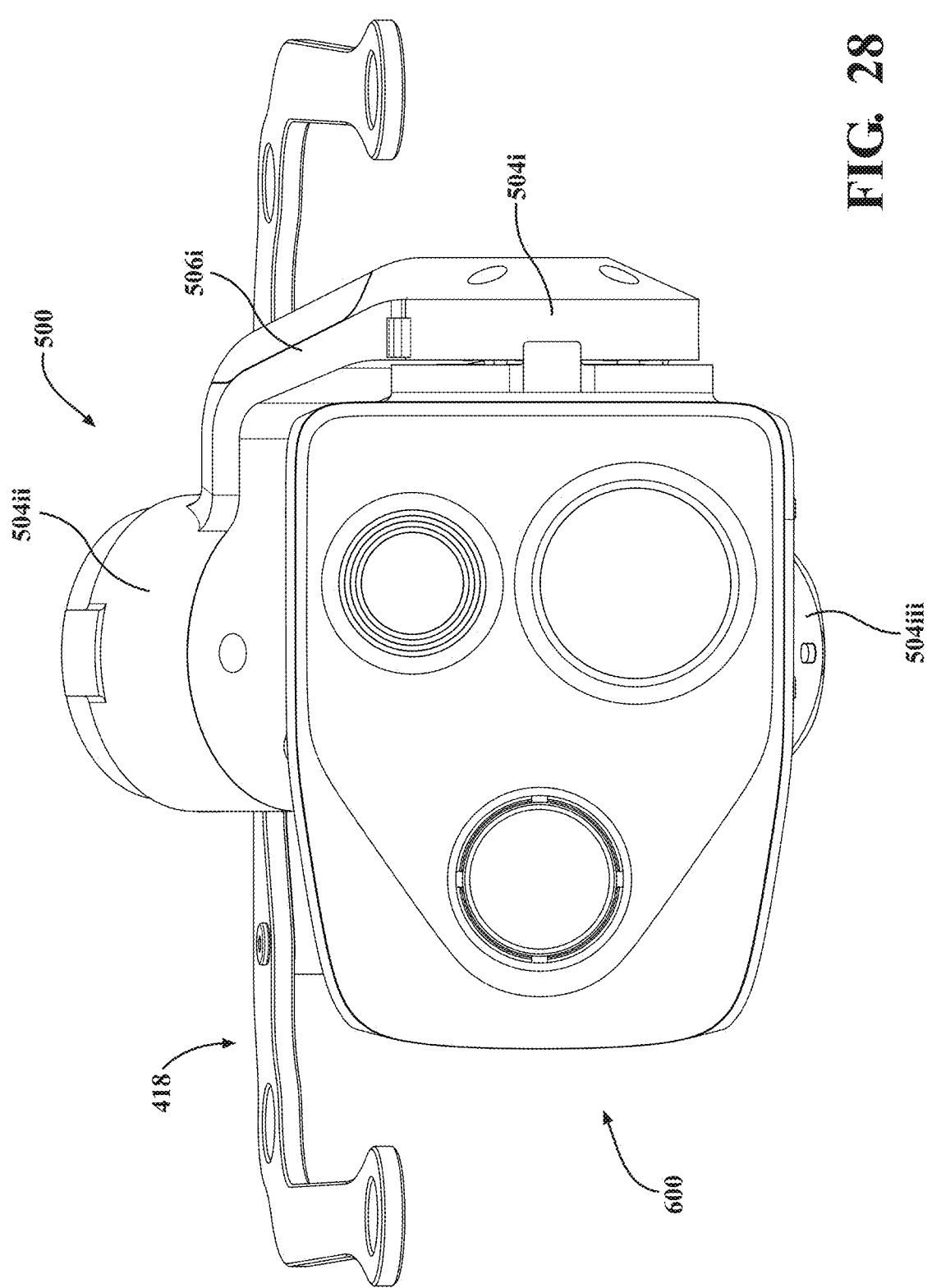
FIG. 28 is a partial, front, plan view of the gimbal module illustrating: an isolation frame; a gimbal assembly that is supported by the isolation frame; and a head assembly that is supported by the gimbal assembly.
Figure 29:
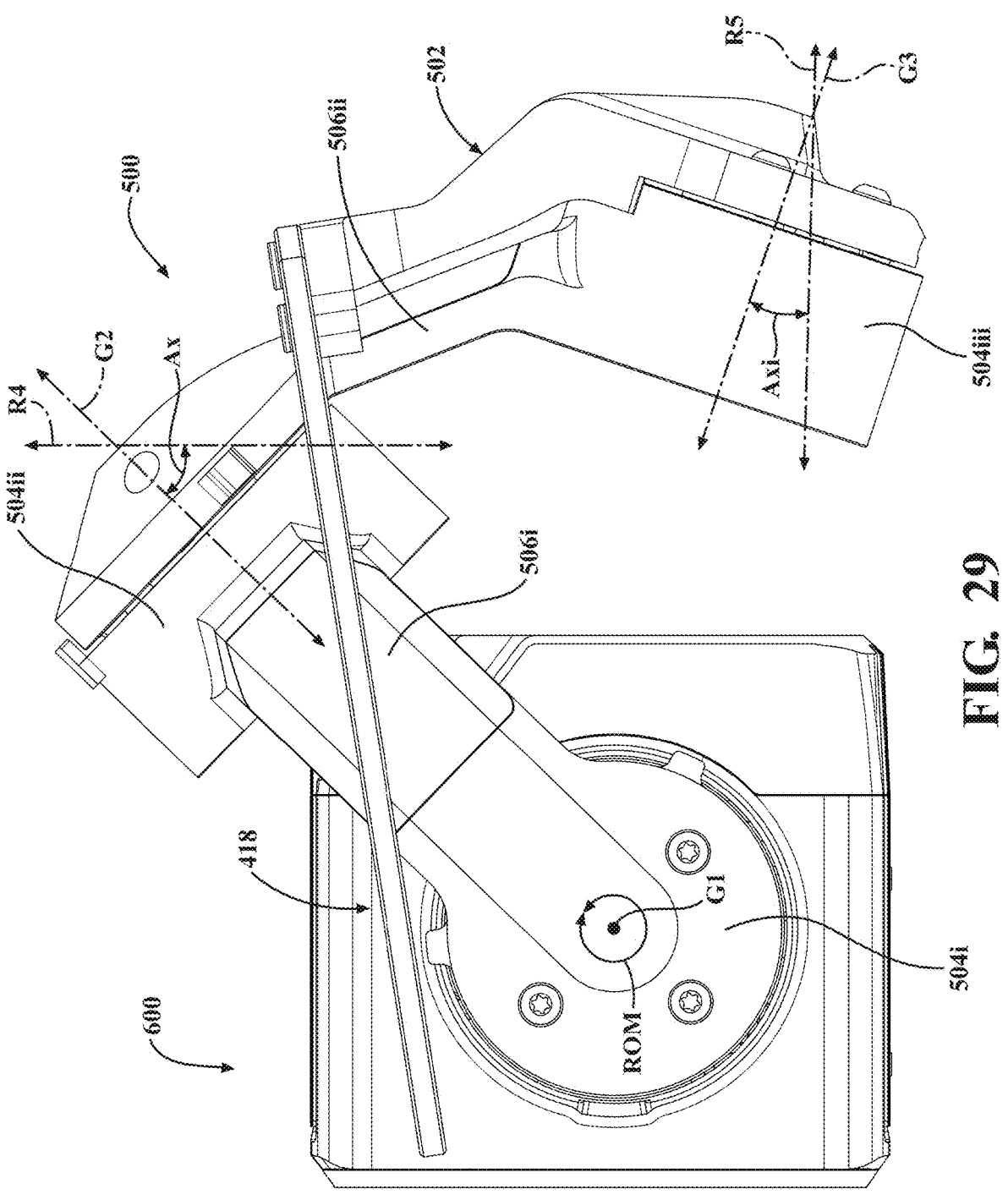
FIG. 29 is a side, plan view of the isolation frame, the gimbal assembly, and the head assembly.
Figure 30:
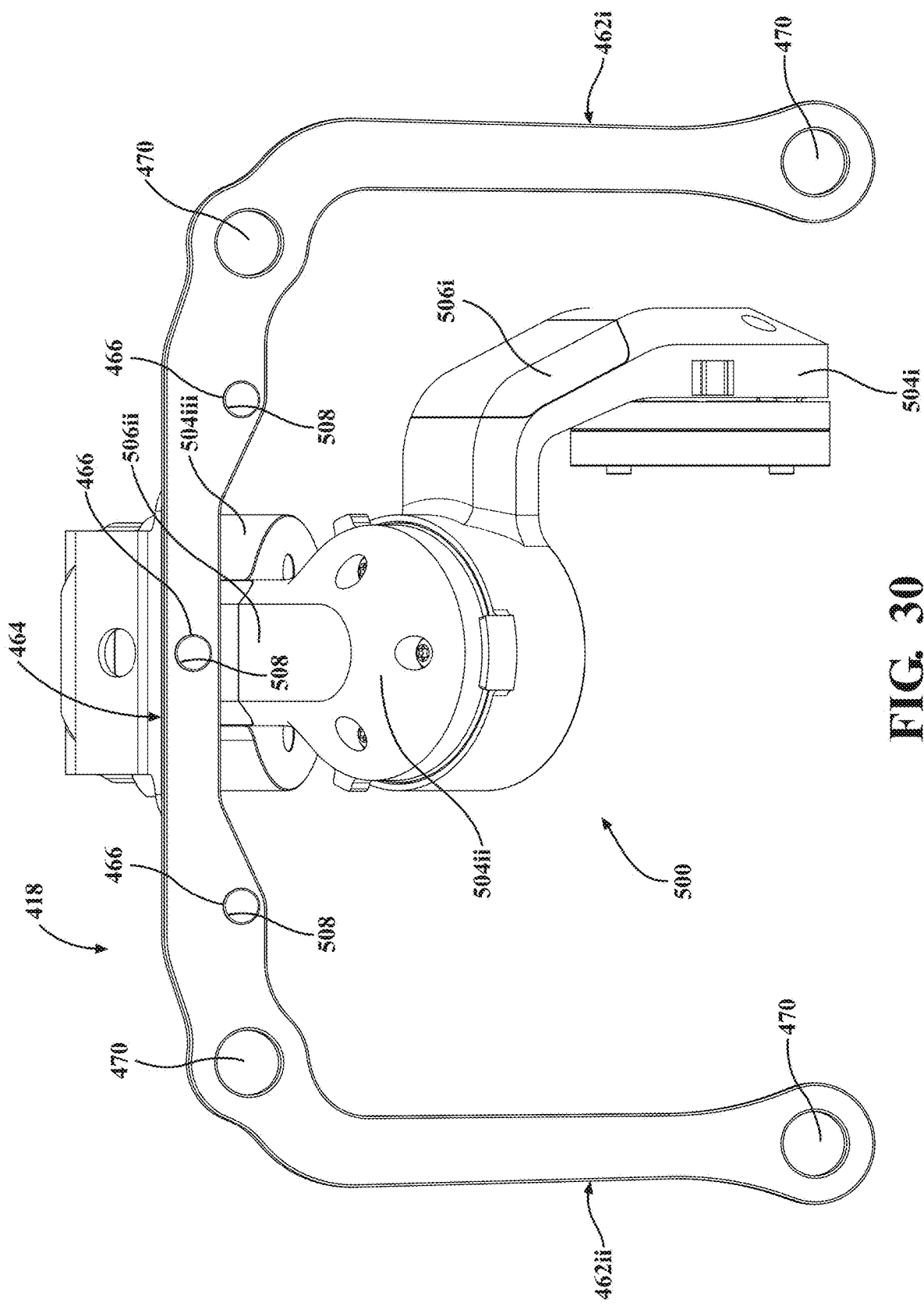
FIG. 30 is a top, plan view of the isolation frame and the gimbal assembly.
Figure 31:
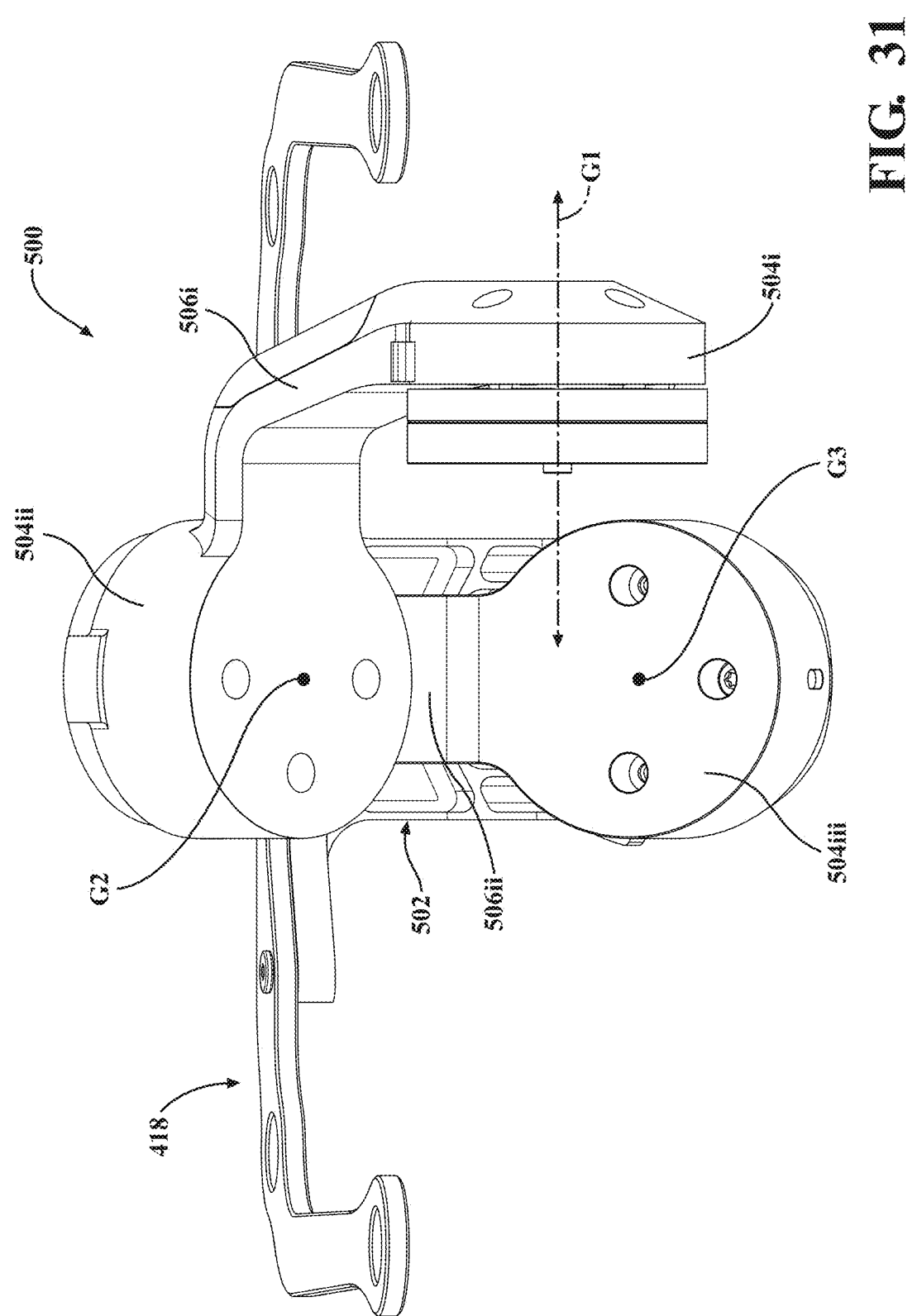
FIG. 31 is a front, plan view of the isolation frame and the gimbal assembly.

With reference now to FIGS. 28-31 as well, the armature 400 is secured (connected) to the body 18 of the UAV 10 (e.g., the chassis 20) and extends in generally non-parallel relation to the length L (FIG. 1) of the UAV 10. More specifically, as seen in FIG. 1, the armature 400 extends at an acute, downward angle Aii in relation to a reference axis R1 that extends in generally parallel relation to the length L of the UAV 10, which improves visualization by further eliminating impediments when the gimbal module 300 is in the generally vertical, upward position (FIGS. 26, 27).

In the illustrated embodiment, the armature 400 is configured such that the angle Aii lies substantially within the range of approximately 5 degrees to approximately 25 degrees (e.g., such that the angle Aii is equal to approximately 15 degrees). Embodiments in which the armature 400 may be configured such that the angle Aii lies outside of the disclosed range are also envisioned herein (e.g., depending upon the particular configuration of the gimbal module 300, the size of the UAV 10, etc.), however, and would not be beyond the scope of the present disclosure.

The armature 400 is generally U-shaped in configuration and defines a receiving space 402 (FIGS. 24, 26) that accommodates the head assembly 600 such that the head assembly 600 is articulable (movable, repositionable, rotatable) in relation to the armature 400 within the receiving space 402. The armature 400 includes: respective rear and front ends 404, 406; a scaffold 408, which is comprised of an upper (first) frame 410 and a lower (second) frame 412; an electrical housing 414, which is positioned at the rear end 406 of the armature 400; an isolation assembly 416, which is supported by (secured, connected to) the scaffold 408 and includes an isolation (third) frame (plate) 418 and a plurality of dampers 420.

The scaffold 408 provides structural support to the gimbal module 300 to support the weight of the head assembly 600 and is generally U-shaped in configuration, which increases the overall strength of the gimbal module 300 and accounts for the cantilevered positioning thereof.

Figure 24:
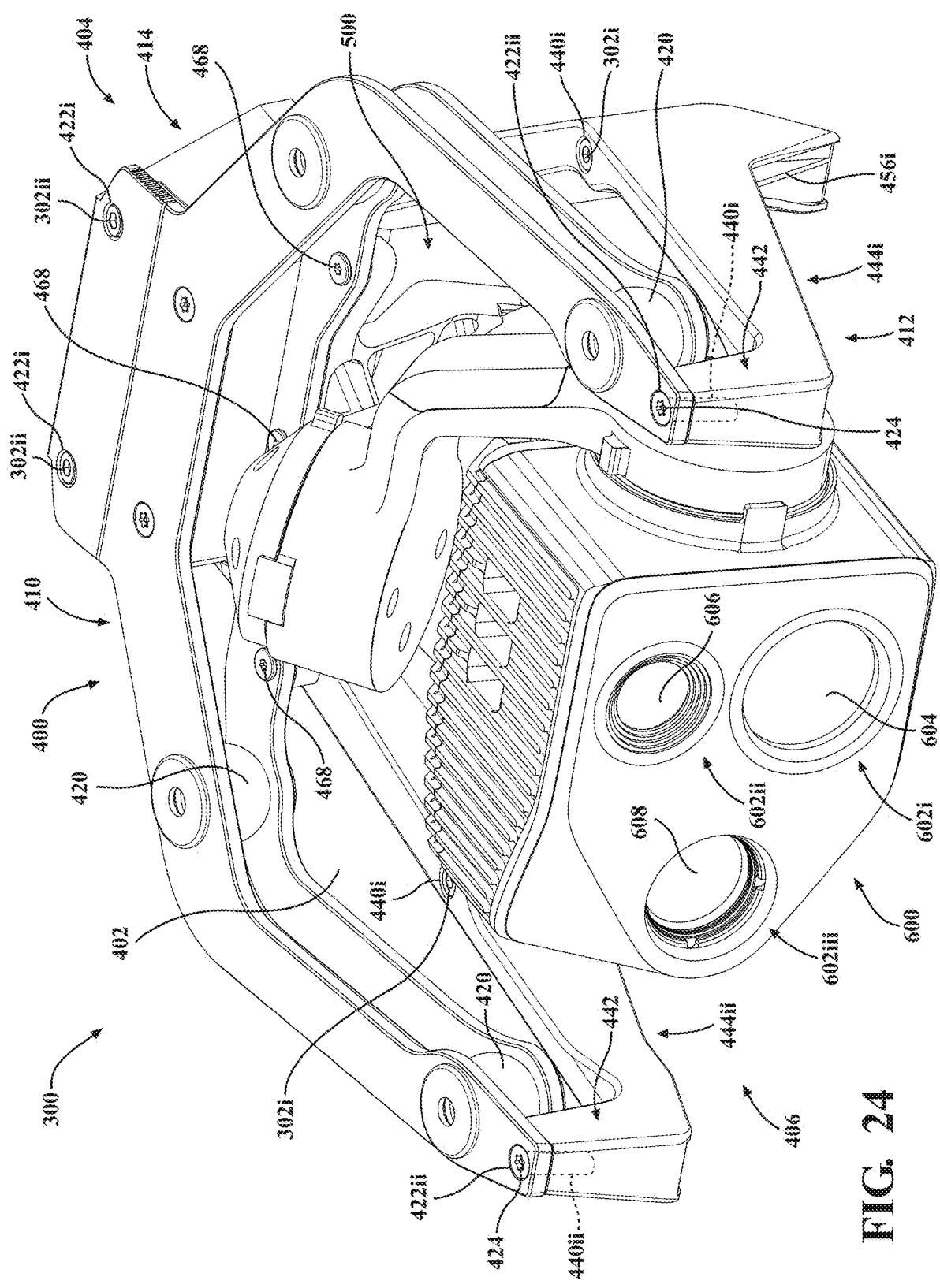
FIG. 24 is a top, front, perspective view of a gimbal module of the UAV.

As seen in FIG. 1, the scaffold 408 is supported by (secured (connected) to) the body 18 of the UAV 10 (e.g., the chassis 20) so as to inhibit relative movement therebetween. More specifically, the scaffold 408 is respectively secured (connected) to the front chassis 30 and the rear chassis 32 by the mechanical fasteners 302i, 302ii (FIGS. 4, 24). The mechanical fasteners 302 thus extend through the armature 400 and into the chassis 20 in order to facilitate repeated connection and disconnection of the gimbal module 300 and achieve the modularity and interchangeability described herein.

The upper frame 410 is fixedly connected to the rear chassis 32 and to the lower frame 412 so as to inhibit relative movement therebetween. More specifically, the upper frame 410 includes a plurality of (first) apertures 422i (FIGS. 24, 26), which receive the mechanical fasteners 302ii such that the mechanical fasteners 302ii extend through the upper frame 410 and into the rear chassis 32, and a plurality of (second) apertures 422ii, which receive mechanical fasteners 424 (e.g., screws, pins, rivets, clips, magnets, etc.) such that the mechanical fasteners 424 extend through the upper frame 410 and into the lower frame 412.

The upper frame 410 is generally U-shaped in configuration and includes a pair of generally identical legs 426i, 426ii (FIG. 26) that are connected by a backspan 428 such that the legs 426i, 426ii extend in a generally forward direction from the backspan 428. As seen in FIG. 26, in the illustrated embodiment, the 426i, 426ii are non-linear in configuration. More specifically, the leg 426i includes a (first, rear) segment 430i and a (second, front) segment 432i that extends from the segment 430i at a (first) (obtuse) angle Aiii so as to define a (first) elbow 434i, and the leg 426ii includes a (first, rear) segment 430ii and a (second, front) segment 432ii that extends from the segment 430ii at a (second) (obtuse) angle Aiv, which is generally identical to the angle Aiii, so as to define a (second) elbow 434ii. Embodiments in which the legs 426i, 426ii may be generally linear in configuration (e.g., embodiments that are devoid of the elbows 434i, 434ii) are also envisioned herein, however, and would not be beyond the scope of the present disclosure.

Figure 25:
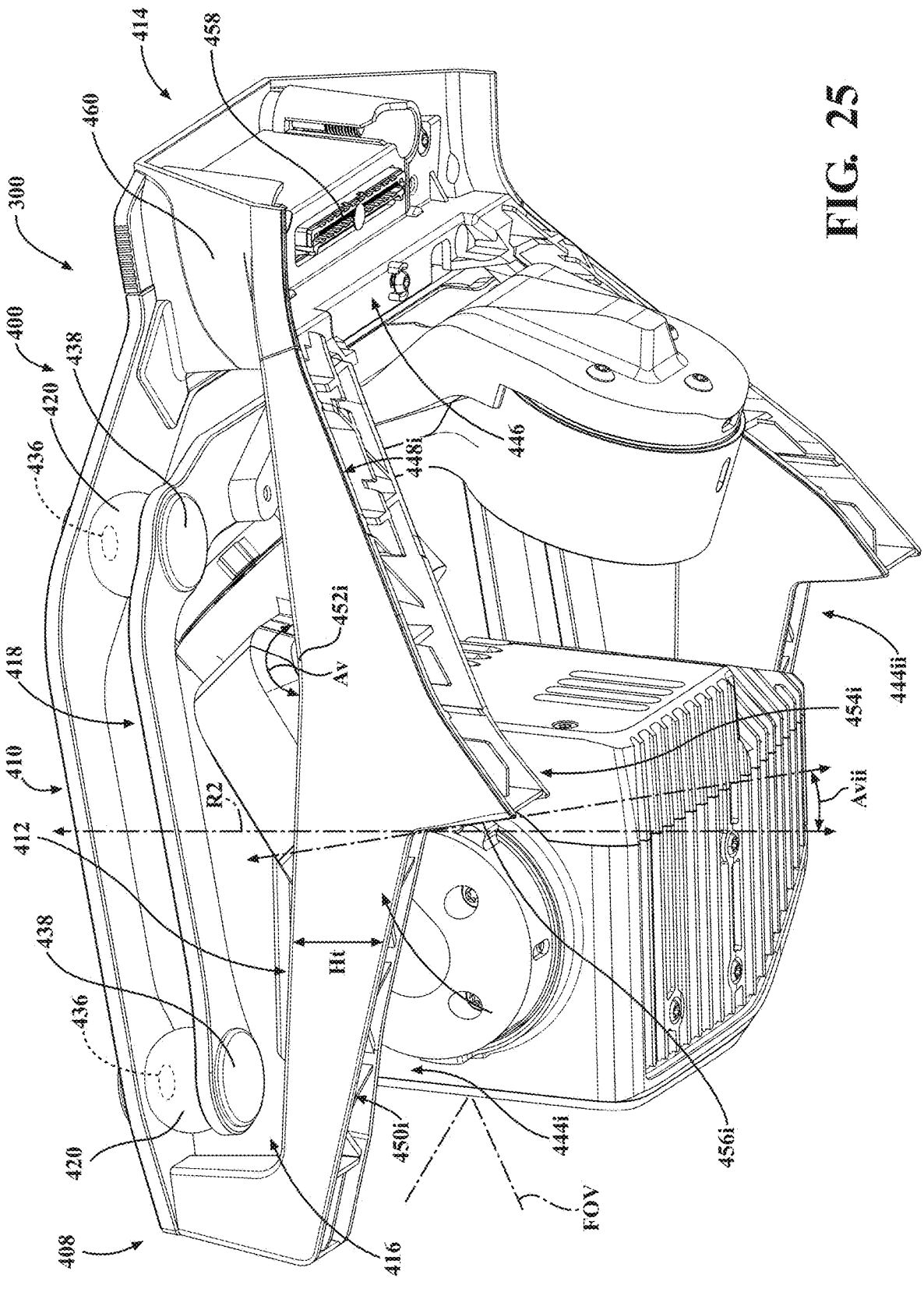
FIG. 25 is a bottom, rear, perspective view of the gimbal module.

As seen in FIG. 25, the upper frame 410 includes (defines) a plurality of openings 436, which extend through the legs 426i, 426ii and are configured to receive mechanical fasteners 438 (e.g., screws, pins, rivets, clips, etc.) in order to facilitate connection (attachment) of the dampers 420, as described in further detail below.

In addition to the upper frame 410, the lower frame 412 is fixedly connected to the front chassis 30 so as to inhibit relative movement therebetween. More specifically, the lower frame 412 includes a plurality of (first) apertures 440i (FIG. 24), which receive the mechanical fasteners 302i such that the mechanical fasteners 302i extend through the lower frame 412 and into the front chassis 30, and a plurality of bosses 442, which include a plurality of (second) apertures 440ii that receive the mechanical fasteners 424 such that the mechanical fasteners 424 extend through the upper frame 410 and into the bosses 442.

The lower frame 412 is generally U-shaped in configuration and includes a pair of generally identical tusks 444i, 444ii (FIGS. 24, 25) that are connected by a crossbar 446 such that the tusks 444i, 444ii extend in a generally forward direction from the crossbar 446. More specifically, the tusk 444i includes a rear (first) section 448i and a front (second) section 450i, and the tusk 444ii includes a rear (first) section 448ii (FIG. 27) and a front (second) section 450ii. As seen in FIG. 27, the front sections 450i, 450ii of the tusks 444i, 444ii include (support) the bosses 442, which extend therefrom in a generally vertical orientation so as to facilitate connection of the upper frame 410 to the lower frame 412 via the mechanical fasteners 424.

In the illustrated embodiment, the tusks 444i, 444ii each include a non-linear configuration. More specifically, the front sections 450i, 450ii extend from the rear sections 448i, 448ii at generally identical (obtuse) angles Av (FIG. 25), Avi (FIG. 27) so as to define bends 452i, 452ii, respectively, which reduces the overall size of the gimbal module 300. Embodiments in which the tusks 444i, 444ii may be generally linear in configuration are also envisioned herein, however, and would not be beyond the scope of the present disclosure.

In order to inhibit (if not entirely prevent) the lower frame 412 from obstructing (entering) the field-of-view FOV of the gimbal module 300 (e.g., when the gimbal module 300 is rotated approximately 180 degrees from the generally vertical, upward position (FIGS. 26, 27) and is oriented in an opposite, generally vertical, downward position), the sections 450i, 450ii of the tusks 444i, 444ii include tapered configurations. More specifically, the sections 450i, 450ii of the tusks 444i, 444ii define heights Ht that decrease as distance from the sections 448i, 448ii increases, respectively.

In certain embodiments, such as that illustrated throughout the figures, the tusks 444i, 444ii include reinforcements 454i (FIG. 25), 454ii (FIG. 27) (e.g., areas of increased thickness and/or added material) at the intersections of the sections 448i, 448ii and the sections 450i, 450ii, respectively, in order to increase the strength and/or the rigidity of the lower frame 412 and, thus, the armature 400. In order to further inhibit (if not entirely prevent) the lower frame 412 from obstructing (entering) the field-of-view FOV of the gimbal module 300 (e.g., when the gimbal module in oriented in the generally vertical, downward position), the reinforcements 454i, 454ii are angled rearwardly (e.g., away from the head assembly 600). More specifically, the reinforcements 454i, 454ii define end walls 4561, 456ii that extend at generally identical angles Avii, Aviii in relation to a generally vertical reference axes R2, respectively.

In the illustrated embodiment, the tusks 444i, 444ii are configured such that the angles Avii, Aviii lie substantially within the range of approximately 5 degrees to approximately 15 degrees (e.g., such that the angles Avii, Aviii are equal to approximately 10 degrees). Embodiments in which the tusks 444i, 444ii may be configured such that the angles Avii, Aviii lie outside of the disclosed range are also envisioned herein, however, and would not be beyond the scope of the present disclosure.

With reference to FIG. 25, the electrical housing 414 will be discussed, which is collectively defined by the upper and lower frames 410, 412. The electrical housing 414 includes the various electrical components (circuitry, logic boards, etc.) that facilitate electrical communication between the gimbal module 300 and the UAV 10, which allows for the transmission of data and/or power to and/or from the gimbal module 300 to support operation thereof, as well as identification of the gimbal module 300 by the UAV 10, calibration of the gimbal module 300 and/or the UAV 10, etc., in order to support the modular functionality and the interchangeability of the gimbal module 300 described herein.

In order to establish an electrical interface between the gimbal module 300 and the UAV 10, the gimbal module 300 (e.g., the electrical housing 414) and the UAV 10 include respective corresponding (first and second) electrical interfaces 458 (FIG. 25), 84 (FIGS. 4, 22), respectively. More specifically, the electrical interface 458 is supported by (secured, connected to) the scaffold 408 (e.g., the lower frame 412), and the electrical interface 84 is located at the front end 14 of the UAV 10. More specifically, the electrical interface 84 is located adjacent to and rearwardly of the intake port 208 and is supported by (secured, connected to) the rear chassis 32.

In certain embodiments, it is envisioned that gimbal module 300 and the UAV 10 may be wirelessly connected, which would allow for sealing of the electronics as well as the avoidance of a mechanical connection therebetween.

In order to protect the electrical interfaces 458, 84, the electrical housing 414 includes a guard (shroud) 460 (FIG. 25), which is supported by (secured, connected to) the upper frame 410. In certain embodiments, it is envisioned that the guard 460 may be integrally (unitarily, monolithically) formed with the upper frame 410 (e.g., from a single piece of material). Alternatively, it is envisioned that the upper frame 410 and the guard 460 may be formed as separate, discrete components of the armature 400, as seen in the illustrated embodiment, which may be secured (connected) together in any suitable manner (e.g., via one or more mechanical fasteners, in a press (snap) fit arrangement, etc.). More specifically, in the illustrated embodiment, the guard 460 includes (e.g., is formed partially or entirely from) polycarbonate.

Upon attachment of the gimbal module 300 to the UAV 10, the guard 460 extends about the electrical interfaces 458, 84, which inhibits (if not entirely prevents) dust, debris, water, etc., from contacting the electrical interface 458 and/or the electrical interface 84, as well as unintended (electrical) disconnection of the gimbal module 300 and the UAV 10 (e.g., in the event of contact between the UAV 10 and an external object).

The isolation assembly 416 supports the gimbal assembly 500 and, thus, the head assembly 600. More specifically, the isolation assembly 416 is suspended by the scaffold 408, which inhibits (if not entirely prevents) the transmission of certain forces (e.g., with particular frequencies) to the head assembly 600 during operation of the UAV 10, as described in further detail below, in order to improve image quality and reduce distortion.

The isolation frame 418 is supported by the scaffold 408. More specifically, the isolation frame 418 is indirectly secured (connected) to the scaffold 408 (e.g., the upper frame 410) via the dampers 420 and the mechanical fasteners 438, which extend through the isolation frame 418, the dampers 420, and the upper frame 410, whereby the isolation frame 418 and, thus, the gimbal assembly 500 and the head assembly 600, are devoid of any direct connection to the scaffold 408.

The isolation frame 418 is generally U-shaped in configuration, whereby the scaffold 408 (e.g., the respective upper and lower frames 410, 412) and the isolation frame 418 collectively define the receiving space 402 (FIGS. 24, 26) and attribute the aforementioned generally U-shaped configuration to the armature 400. More specifically, the isolation frame 418 includes a pair of generally identical legs 462i, 462ii (FIG. 30) that are connected by a backspan 464 such that the legs 462i, 462ii extend in a generally forward direction from the backspan 464.

In order to facilitate connection of the isolation frame 418 to the gimbal assembly 500 and the scaffold 408 (e.g., the upper frame 410), the isolation frame 418 includes a plurality of apertures 466, which extend through the backspan 464 and are configured to receive mechanical fasteners 468 (FIGS. 24, 26, 27) (e.g., screws, pins, rivets, clips, etc.) such that the mechanical fasteners 468 extend through the isolation frame 418 and into the gimbal assembly 500, and a plurality of openings 470, which correspond in configuration to and are generally aligned with the openings 436 (FIG. 25) in the upper frame 410. The openings 470 extend through the legs 462i, 462ii and are configured to receive the mechanical fasteners 438 (FIG. 25) and the dampers 420 in order to facilitate assembly (connection, attachment) of the upper frame 410 and the isolation frame 418 via the dampers 420 and the mechanical fasteners 438.

In certain embodiments, it is envisioned that the openings 436 in the upper frame 410 and the openings 470 in the isolation frame 418 may be configured to receive the dampers 420 such that the dampers 420 extend into and/or through the openings 436, 470. For example, it is envisioned that the openings 436, 470 may be configured to receive the dampers 420 such that the dampers 420 extend partially into, and nest within, the openings 436, 470. Additionally, or alternatively, it is envisioned that the openings 436 in the upper frame 410 and the openings 470 in the isolation frame 418 may be configured to receive springs, actuators, etc., in order to transit the desired forces.

As seen in FIGS. 24, 25, and 27, the dampers 420 are positioned between the scaffold 408 (e.g., the upper frame 410) and the isolation frame 418, and are configured to absorb forces that are applied to the UAV 10 (e.g., the gimbal module 300). The isolation frame 418, the dampers 420, and the mechanical fasteners 438 thus function to suspend the gimbal assembly 500 and the head assembly 600, which isolates the gimbal assembly 500 and the head assembly 600 from any applied forces and inhibits (if not entirely prevents) the transmission of such forces thereto, as indicated above.

In order to facilitate such force absorption, it is envisioned that the dampers 420 may include (e.g., may be formed from) any suitable material or combination of materials. For example, it is envisioned that the dampers 420 may include (e.g., may be formed partially or entirely from) at least one (one or more) compliant material such as rubber, silicone, etc. Additionally, or alternatively, it is envisioned that the dampers 420 may include at least one (one or more) fluids, gasses, foams, etc.

It is envisioned that the dampers 420 may experience deformation (e.g., compression and expansion) under the influence of the forces applied to the UAV 10 (e.g., the gimbal module 300), which allows for movement (displacement) of the isolation frame 418 and, thus, the gimbal assembly 500 and the head assembly 600 (e.g., in relation to the scaffold 408).

As indicated above, the armature 400 extends in generally non-parallel relation to the length L of the UAV 10 and is oriented at the aforementioned acute, downward angle Aii (FIG. 1), which results in orientation of the dampers 420 in generally non-parallel relation to the height H of the UAV 10. More specifically, the dampers 420 are pitched forward and are oriented along axes Rd (FIG. 27) that subtend an angle Aix with a generally vertical reference axis R3, which is generally identical to the angle Aii (FIG. 1).

It is envisioned that the scaffold 408 (e.g., the upper and lower frames 410, 412) and the isolation frame 418 may include any suitable material or combination of materials. For example, in the illustrated embodiment, the upper frame 410 and the isolation frame 418 are each laminated in construction, and each include a first (non-metallic) material of construction, whereas the lower frame 412 is injection molded from a second (non-metallic) material of construction that is different from and less rigid than the first material of construction. More specifically, the upper frame 410 and the isolation frame 418 each include (e.g., are formed partially or entirely from) a carbon fiber composite, and the lower frame includes (e.g., is formed partially or entirely from) a carbon fiber reinforced plastic. Embodiments in which the upper frame 410, the lower frame 412, and/or the isolation frame 418 may be metallic in construction are also envisioned herein, however, as are embodiments in which the upper frame 410, the lower frame 412, and/or the isolation frame 418 may include generally identical materials of construction.

In the illustrated embodiment, the gimbal module 300 includes four dampers 420. It should be appreciated, however, that the specific number of dampers 420 and/or the orientations thereof may be varied without departing from the scope of the present disclosure. As such, embodiments in which the gimbal module 300 may include fewer and greater numbers of dampers 420 are also envisioned herein. For example, an embodiment in which the gimbal module 300 includes a single damper 420 that is configured as a gasket (or the like) would not be beyond the scope of the present disclosure. As such, it is envisioned that the gimbal module 300 may include a single damper 420 or a plurality of dampers 420, as illustrated throughout the figures.

The gimbal assembly 500 extends from and is supported by (e.g., secured, connected) to the armature 400 (e.g., the isolation frame 418), and supports (is secured, connected to) the head assembly 600 such that the gimbal assembly 500 is positioned between and separates the armature 400 and the head assembly 600. More specifically, the gimbal assembly 500 includes: a mount 502; a (first, pitch) motor 504*i*; a (second, yaw) motor 504*ii*; a (third, roll) motor 504*iii*; a (first) arm 506*i* that extends between (and supports) the motors 504*i*, 504*ii*; and a (second) arm 506*ii* that extends between (and supports) the motors 504*ii*, 504*iii*.

The mount 502 is supported by (secured, connected to) the isolation assembly 416 (e.g., the isolation frame 418) and extends generally vertically therefrom in a downward direction. In order to facilitate connection of the isolation assembly 416 to the mount 502, the mount 502 includes a plurality of apertures 508, which extend through the mount 502 and are configured to receive the mechanical fasteners 468 (FIGS. 24, 26, 27) such that the mechanical fasteners 468 extend through the isolation frame 418 and into the mount 502.

In the illustrated embodiment, isolation frame 418 and the mount 502 are configured as discrete components of the gimbal module 300. More specifically, whereas the isolation frame 418 includes (e.g., is formed partially or entirely from) the aforementioned carbon fiber composite, the mount 502 includes (e.g., is formed partially or entirely from) magnesium. Embodiments in which the isolation frame 418 and the mount 502 may be integrally (unitarily, monolithically) formed (e.g., from a single piece of material), however, are also envisioned herein and would not be beyond the scope of the present disclosure.

The gimbal assembly 500 is configured to facilitate repositioning of the of the head assembly 600 (e.g., in relation to the armature 400) during operation of the UAV 10 via articulation (rotation) about a plurality of axes G (FIGS. 29, 31) in order to reposition the FOV (FIGS. 2, 25) and thereby facilitate robust content capture in a variety of directions. More specifically, the motor 504*i* is configured to rotate the head assembly 600 about a (first, pitch) axis G1; the motor 504*ii* is configured to rotate the head assembly 600 about a (second, yaw) axis G2; and the motor 504*iii* is configured to rotate the head assembly 600 about a (third, roll) axis G3.

In known UAVs, the included gimbal motors are typically oriented in generally orthogonal (perpendicular) relation to each other, which results in a larger form factor and/or increased weight and necessitates the use of a larger UAV to carry the payload. In contrast, the gimbal module 300 is configured such that the axes G are oriented in generally non-orthogonal (non-perpendicular) relation. As can be appreciated through reference to FIGS. 29-31, the gimbal module 300 is configured such that the axis G2 is oriented in generally non-orthogonal (non-perpendicular) relation to the axis G1, and the axis G3 is oriented in generally non-orthogonal (non-perpendicular) relation to the axis G2. More specifically, in the illustrated embodiment, the gimbal module 300 is configured such that the axis G1 extends in generally parallel relation to the width W (FIG. 4) of the UAV 10, the axis G2 is angled forwardly (e.g., away from the body 18 of the UAV 10) and subtends a (first) angle Ax with a (first) reference axis R4 that extends in generally parallel relation to the height H (FIG. 1) of the UAV 10 that lies substantially within the range of approximately 40 degrees to approximately 50 degrees (e.g., such that the angle Ax is equal to approximately 45 degrees), and the third axis G3 is angled vertically upward and subtends a (second) angle Axi with a (second) reference axis R5 that extends in generally parallel relation to the length L (FIG. 1) of the UAV 10 that lies substantially within the range of approximately 15 degrees to approximately 25 degrees (e.g., such that the angle Axi is equal to approximately 20 degrees). The generally non-orthogonal (non-perpendicular) orientations of the axes G reduces the form factor of the gimbal module 300 and/or the weight thereof, which allows for reductions in the overall size and power requirements of the UAV 10.

In the illustrated embodiment, the gimbal module 300 is configured such that the axes G1, G2, and G3 intersect. Embodiments in which the gimbal module 300 may be configured such that one or more of the axes G1, G2, and G3 are skew axes (i.e., non-intersecting) are also envisioned herein and would not be beyond the scope of the present disclosure.

In order to facilitate orientation of the gimbal module 300 in the generally vertical, upward position (FIGS. 26, 27), and, thus, the capture of content located (vertically) above the UAV 10, the motor 504*i* is configured to rotate the head assembly 600 through a (bidirectional) range of motion ROM (FIG. 29) (about the axis G1) that lies substantially within the range of approximately 160 degrees to approximately 270 degrees (e.g., such that the range of motion about the axis G1 is approximately 180 degrees). Embodiments in which the gimbal module 300 may be configured such that the range of motion about the axis G1 lies outside of the disclosed range are also envisioned herein, however, and would not be beyond the scope of the present disclosure.

The configuration of the gimbal module 300 (e.g., orientation of the motors 504i, 504ii, 504iii in the manner indicated above), not only further reduces the form factor of the gimbal module 300, but facilitates rotation of the gimbal module 300 about the axis G1 in order to achieve the generally vertical, upward position (FIGS. 26, 27) and the generally vertical, downward position by reducing the area required for articulation (rotation) of the gimbal module 300.

The head assembly 600 is supported by (secured, connected) to the gimbal assembly 500, and, thus, the armature 400, as seen in FIGS. 24-27. More specifically, the gimbal module 300 extends forwardly from the chassis 20 such that the head assembly 600 is positioned between respective uppermost and lowermost surfaces 86, 88 (FIG. 1) of the body 18, respectively.

The head assembly 600 includes (supports) at least one (one or more) optical components 602 (e.g., lenses, cameras, video recorders, etc.) that facilitate image capture and define the FOV (FIGS. 2, 25) of the gimbal module 300. As seen in FIG. 2, due to the cantilevered positioning of the gimbal module 300, the optical component(s) 602 are located forwardly of the chassis 20, which further inhibits (if not entirely prevents) the body 18 of the UAV 10 from obstructing (entering) the FOV of the gimbal module 300.

In certain embodiments, it is envisioned that the head assembly 600 may include (support) at least one (one or more) non-optical components (e.g., a radar module or a sonar module), either in addition to or instead of the optical component(s) 602.

With reference to FIG. 24 in particular, the head assembly 600 is configured such that the FOV of the gimbal module 300 lies substantially within the range of approximately 50 degrees to approximately 70 degrees (e.g., such that the FOV is approximately 60 degrees) and includes: a first optical component 602i having a first configuration; a second optical component 602ii having a second configuration; and a third optical component 602iii having a third configuration. In various embodiments, it is envisioned that the gimbal module 300 may be configured such that the second configuration is different than the first configuration, and such that the third configuration is the same as or different than the first configuration and/or the second configuration. In the illustrated embodiment, for example, the gimbal module 300 is configured such that the first optical component 602i includes a telephoto lens 604, the second optical component 602ii includes a narrow focus lens 606, and the third optical component 602iii includes a forward-looking infrared (FLIR) lens 608. It should be appreciated, however, that the particular number of optical components 602, the configuration and functionality thereof, and/or the FOV of the gimbal module 300 may be altered in various embodiments without departing from the scope of the present disclosure. For example, embodiments in which the head assembly 600 may include a light source that is configured to provide ambient illumination for the UAV 10 (e.g., a flashlight) are also envisioned herein, as are embodiments in which the head assembly may include two or more optical components 602 with generally identical configurations, and embodiments in which the gimbal module 300 may be configured such that the FOV lies outside of the disclosed range, and would not be beyond the scope of the present disclosure. Embodiments in which the head assembly 600 may include a laser range finder, an event camera, an infrared light source, etc., are also envisioned herein and would not be beyond the scope of the present disclosure.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of up to 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±10%, ±15%, ±25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:
1. An unmanned aerial vehicle (UAV) comprising:
a chassis; and
a gimbal module including at least one optical component facilitating image capture and located at a front end of the UAV such that the gimbal module extends forwardly from the chassis, wherein the gimbal module includes;
a gimbal assembly; and
an armature extending between and directly connected to the chassis and the gimbal module, wherein the armature extends at a downward angle and is configured for removable connection to the chassis to facilitate repeated connection and disconnection of the gimbal module and interchangeability amongst a plurality of gimbal modules.
2. The UAV of claim 1, wherein the at least one optical component includes:
a first optical component having a first configuration;
a second optical component having a second configuration; and
a third optical component having a third configuration.
3. The UAV of claim 2, wherein the gimbal module is configured such that the second configuration is different than the first configuration, and the third configuration is different than the second configuration.
4. The UAV of claim 3, wherein the first optical component includes a telephoto lens, the second optical component includes a narrow focus lens, and the third optical component includes a forward-looking infrared lens.
5. The UAV of claim 1, wherein the gimbal module further includes:

a plurality of fasteners extending through the armature and into the chassis to facilitate repeated connection and disconnection of the gimbal module; and
a head assembly supported by the armature such that the head assembly is repositionable in relation thereto, wherein the head assembly includes the at least one optical component.
6. The UAV of claim 5, wherein the armature includes a generally U-shaped configuration defining a receiving space accommodating the head assembly such that the head assembly is repositionable in relation to the armature within the receiving space.
7. The UAV of claim 5, wherein the armature includes:
a scaffold connected to the chassis so as to inhibit relative movement therebetween; and
an isolation assembly supported by the scaffold, wherein the isolation assembly is configured to inhibit force transmission to the head assembly during operation of the UAV.
8. The UAV of claim 7, wherein the armature further includes:
an electrical housing including a first electrical interface configured for electrical connection to a second electrical interface on the chassis such that the gimbal module is operable upon connection.
9. The UAV of claim 7, wherein the gimbal assembly is supported by the isolation assembly and is configured to facilitate articulation of the head assembly.
10. The UAV of claim 9, wherein the gimbal assembly includes:
a first motor configured to rotate the head assembly about a first axis;
a second motor configured to rotate the head assembly about a second axis; and
a third motor configured to rotate the head assembly about a third axis, wherein the second axis is oriented in generally non-orthogonal relation to the first axis, and the third axis is oriented in generally non-orthogonal relation to the second axis.
11. An unmanned aerial vehicle (UAV) comprising:
a body including:
a front chassis; and
a rear chassis connected to the front chassis;
a scaffold supported by the body and including:
an upper frame; and
a lower frame connected to and positioned vertically below the upper frame;
an isolation frame supported by the scaffold;
a gimbal assembly supported by the isolation frame;
a head assembly supported by the gimbal assembly such that the head assembly is repositionable during operation of the UAV, wherein the head assembly includes at least one optical component facilitating image capture; and
at least one damper positioned between the scaffold and the isolation frame in order to inhibit force transmission to the head assembly during operation of the UAV.
12. The UAV of claim 11, wherein the gimbal assembly is configured to rotate the head assembly about a plurality of axes oriented in generally non-orthogonal relation.
13. The UAV of claim 11, wherein the scaffold includes a first electrical interface configured for electrical connection to a second electrical interface on the body.
14. The UAV of claim 11, wherein the upper frame is fixedly connected to the rear chassis so as to inhibit relative movement therebetween, and the lower frame is fixedly connected to the upper frame and the front chassis so as to inhibit relative movement therebetween.

15. The UAV of claim 14, wherein the upper frame includes a first material of construction, and the lower frame includes a second material of construction different than the first material of construction.

16. The UAV of claim 15, wherein the second material of construction is less rigid than the first material of construction.

17. The UAV of claim 15, wherein the isolation frame includes the first material of construction, wherein the first material of construction and the second material of construction are each non-metallic.

18. A gimbal module for an unmanned aerial vehicle (UAV), the gimbal module comprising:

an armature configured for connection to a body of the UAV such that the gimbal module extends therefrom in cantilevered relation and at a downward angle in relation to a reference axis extending in generally parallel relation to a length of the UAV, wherein the armature is generally U-shaped in configuration and defines a receiving space;

a gimbal assembly supported by the armature; and a head assembly supported by the gimbal assembly such that the head assembly is repositionable in relation to the armature within the receiving space, wherein the head assembly includes at least one optical component facilitating image capture.

19. The gimbal module of claim 18, wherein the armature includes:

a first frame;

a second frame fixedly connected to the first frame so as to inhibit relative movement therebetween; and a third frame supported by the first frame, wherein the gimbal assembly is supported by the third frame.

20. The gimbal module of claim 19, wherein the armature further includes:

at least one damper positioned between the first frame and the third frame in order to inhibit force transmission to the head assembly during operation of the UAV.

* * * * *